United States Patent
Foster et al.

(10) Patent No.: US 7,602,529 B2
(45) Date of Patent: *Oct. 13, 2009

(54) METHOD AND SYSTEM FOR CONTROLLING PRINTER TEXT/LINE ART AND HALFTONE INDEPENDENTLY

(75) Inventors: Thomas J. Foster, Geneseo, NY (US); Gregory Rombola, Spencerport, NY (US)

(73) Assignee: Eastman Kodak Company, Rochester, NY (US)

( * ) Notice: Subject to any disclaimer, the term of this patent is extended or adjusted under 35 U.S.C. 154(b) by 836 days.

This patent is subject to a terminal disclaimer.

(21) Appl. No.: 10/935,460

(22) Filed: Sep. 7, 2004

(65) Prior Publication Data

US 2006/0050317 A1    Mar. 9, 2006

(51) Int. Cl.
*G06K 1/40* (2006.01)
*H04N 15/00* (2006.01)
*H04N 1/405* (2006.01)
*G06K 9/00* (2006.01)

(52) U.S. Cl. .................. 358/2.1; 358/1.9; 358/3.06; 382/100

(58) Field of Classification Search .............. None
See application file for complete search history.

(56) References Cited

U.S. PATENT DOCUMENTS

| | | | |
|---|---|---|---|
| 5,731,823 A | 3/1998 | Miller et al. ............ 347/5 |
| 5,936,741 A | 8/1999 | Burns ..................... 358/298 |
| 5,956,544 A | 9/1999 | Stern et al. | |
| 6,006,013 A | 12/1999 | Rumph et al. ........... 395/114 |
| 6,121,986 A | 9/2000 | Regelsberger et al. | |
| 6,181,438 B1 | 1/2001 | Bracco et al. | |
| 6,704,123 B1 | 3/2004 | Av-Shalom et al. ...... 358/2.99 |
| 2002/0067509 A1* | 6/2002 | Roylance ................ 358/2.1 |
| 2003/0164960 A1* | 9/2003 | Housel .................. 358/1.9 |
| 2003/0210803 A1* | 11/2003 | Kaneda et al. ........... 382/100 |

FOREIGN PATENT DOCUMENTS

| | | |
|---|---|---|
| EP | 0 538 901 | 4/1993 |
| EP | 0 697 784 | 2/1996 |
| EP | 1 110 738 | 6/2001 |
| EP | 1 331 596 | 7/2003 |
| EP | 1 443 751 | 8/2004 |
| WO | WO 01/89194 A2 | 11/2001 |
| WO | WO 02/10860 A1 | 2/2002 |
| WO | WO 02/14957 A1 | 2/2002 |
| WO | 2005/084154 | 9/2005 |

* cited by examiner

*Primary Examiner*—Twyler L Haskins
*Assistant Examiner*—Barbara D Reinier
(74) *Attorney, Agent, or Firm*—William R. Zimmerli; Peyton C. Watkins

(57) ABSTRACT

A method of altering the appearance of an input digital image when printed, the digital image comprised of an array of pixels and wherein each pixel is assigned a digital value representing marking information, and wherein the pixels comprise Text/Line pixels and halftone pixels, the method comprising the steps of changing the value of halftone pixels using a custom tone transfer function that anticipates the effect of the reassigned pixel values on halftone appearance; rasterizing the digital image; reassigning the digital values of all pixels; and, printing the image.

3 Claims, 34 Drawing Sheets

Original object bitmap

Four onion skin layers when thinning

Three onion skin layers when thickening

All layers
(thickening and thinning)

Original

Same grey pixel value assigned to edges and solid area density

Edges when thinning

Lightened -
Solid area density reduced
Letter thinner

Edges when thickening

Thickened
Letter thickened by
applying grey edges which
were originally white

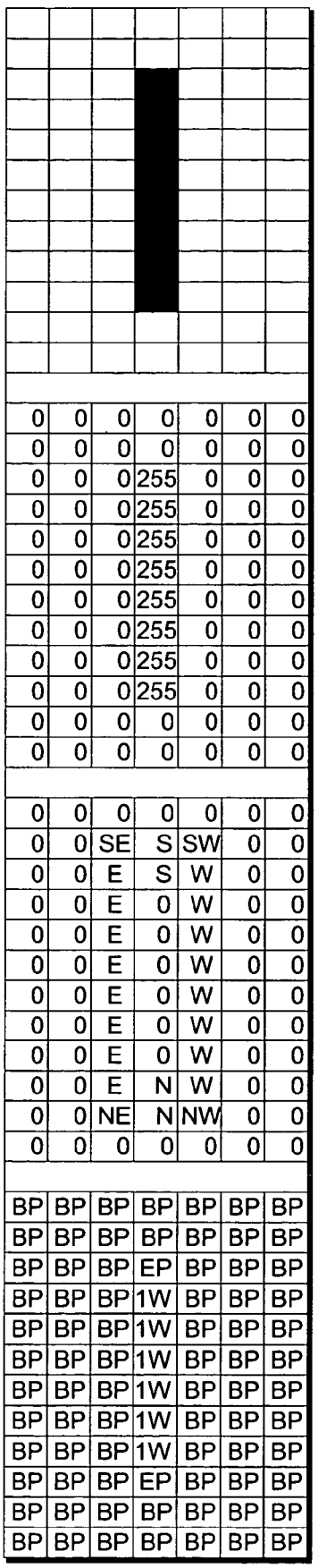
1 Pixel Wide Detection
Original 1 pixel wide line    FIG. 7a
Edge Pixels    FIG. 7b
Direction Values    FIG. 7c
Assignment
BP: Background Pixel
EP: Edge Pixel
1W: One Pixel Wide Line    FIG. 7d

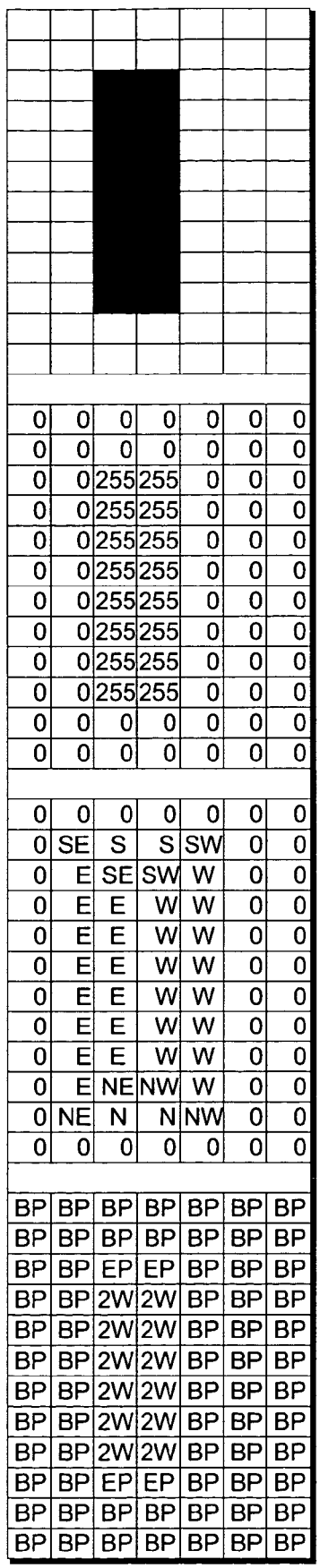
2 Pixel Wide Detection
Original 2 pixel wide line    FIG. 8a
Edge Pixels    FIG. 8b
Direction Values    FIG. 8c
Assignment
BP: Background Pixel
EP: Edge Pixel
2W: Two Pixel Wide Line    FIG. 8d

FIG. 10

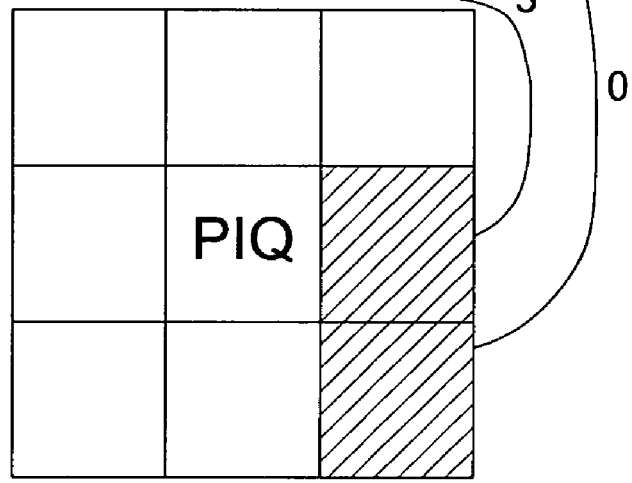

Fig. 18d

|  |  |  |  |  |  |  |  |  |  |  |  |  |  |  |  |
|---|---|---|---|---|---|---|---|---|---|---|---|---|---|---|---|
| 0 | SE | S | S | SW | S | S | S | E | E | SE | SE | SE | SE | S | SE |
| W | SW | SW | S | W | SW | SW | SW | 0 | SE | S | S | SW | S | S | S |
| NE | E | SE | SE | 0 | SE | S | S | E | E | E | SE | E | E | SE | SE |
| NW | 0 | SW | S | W | SW | SW | S | NE | E | SE | SE | 0 | SE | S | S |
| N | NE | 0 | SE | NW | 0 | SW | S | NE | E | E | E | NE | E | SE | SE |
| NW | NW | W | SW | W | W | W | SW | N | NE | 0 | SE | NW | 0 | SW | S |
| N | NE | NE | E | N | NE | 0 | SE | NE | NE | E | E | NE | E | E | E |
| N | N | NW | 0 | NW | NW | W | SW | N | NE | NE | E | N | NE | 0 | SE |
| NW | 0 | SW | S | W | SW | SW | S | NE | E | SE | SE | 0 | SE | S | S |
| W | W | W | SW | W | W | SW | SW | NW | 0 | SW | S | W | SW | SW | S |
| N | NE | 0 | SE | NW | 0 | SW | S | NE | E | E | E | NE | E | SE | SE |
| NW | NW | W | SW | W | W | W | SW | N | NE | 0 | SE | NW | 0 | SW | S |
| N | N | NW | 0 | NW | NW | W | SW | N | NE | NE | E | N | NE | 0 | SE |
| NW | NW | W | W | NW | W | W | W | N | N | NW | 0 | NW | NW | W | SW |
| N | N | N | NE | N | N | NW | 0 | NE | NE | NE | E | N | NE | NE | E |
| NW | N | NW | NW | NW | NW | W | W | N | N | N | NE | N | N | NW | 0 |

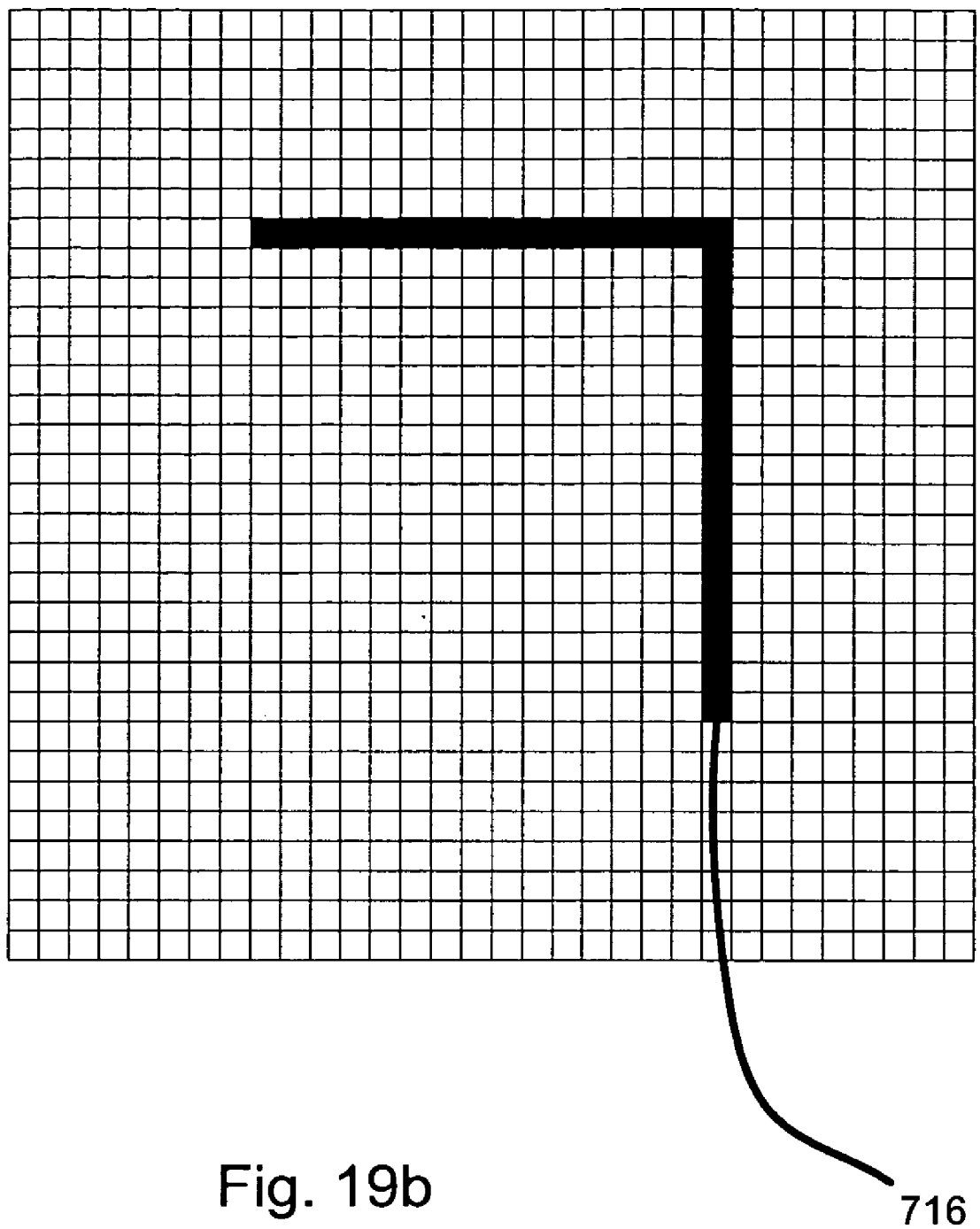
Fig. 19b    716

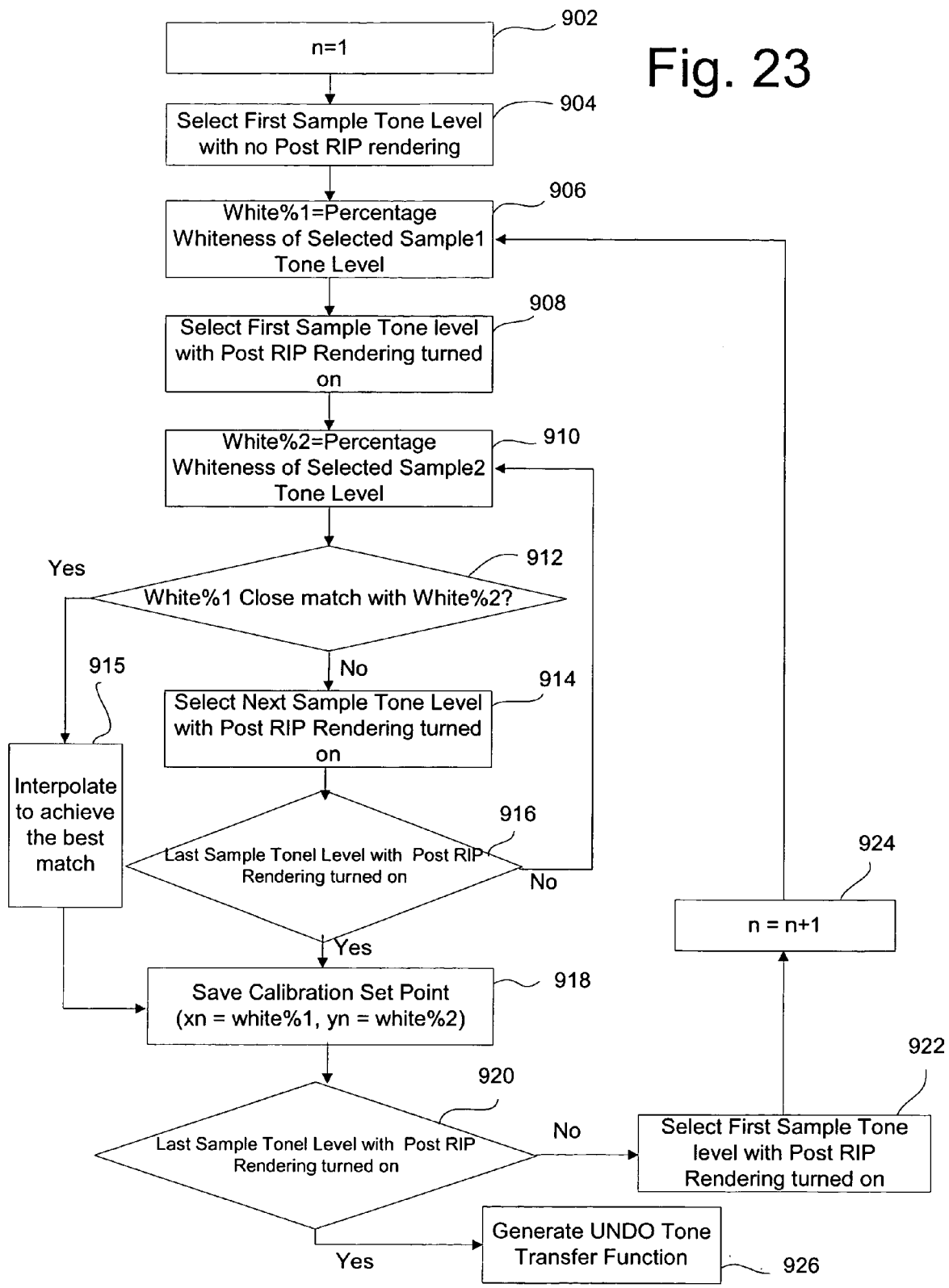

METHOD AND SYSTEM FOR CONTROLLING PRINTER TEXT/LINE ART AND HALFTONE INDEPENDENTLY

FIELD OF THE INVENTION

This invention is in the field of digital printing, and is more specifically directed to image exposure control in electrostatographic printers.

BACKGROUND OF THE INVENTION

Electrographic printing has become the prevalent technology for modern computer-driven printing of text and images, on a wide variety of hard copy media. This technology is also referred to as electrographic marking, electrostatographic printing or marking, and electrophotographic printing or marking. Conventional electrographic printers are well suited for high resolution and high speed printing, with resolutions of 600 dpi (dots per inch) and higher becoming available even at modest prices. As will be described below, at these resolutions, modern electrographic printers and copiers are well-suited to be digitally controlled and driven, and are thus highly compatible with computer graphics and imaging. Controlling the appearance of printed images is an important aspect of printers. An example of such control efforts is described in U.S. Pat. No. 6,181,438, which is hereby incorporated herein by reference.

Efforts regarding printers or printing systems have led to continuing developments to improve their versatility practicality, and efficiency.

BRIEF DESCRIPTION OF THE DRAWINGS

FIG. 7a is a representation of a pixel grid having a one pixel wide toned image provided thereon in accordance with the present invention.

FIG. 7b is a representation of a pixel grid with edge pixel designations for the toned image of FIG. 7a in accordance with the present invention.

FIG. 7c is a representation of a pixel grid with direction values for the toned image of FIG. 7a in accordance with the present invention.

FIG. 7d is a representation of a pixel grid with background pixel, edge pixel and one pixel wide line assignment values for the toned image of FIG. 7a in accordance with the present invention.

FIG. 8a is a representation of a pixel grid having a two pixel wide toned image provided thereon in accordance with the present invention.

FIG. 8b is a representation of a pixel grid with edge pixel assignments for the toned image of FIG. 8a in accordance with the present invention.

FIG. 8c is a representation of a pixel grid with direction values for the toned image of FIG. 8a in accordance with the present invention.

FIG. 8d is a representation of a pixel grid with background pixel, edge pixel and two pixel wide line assignment values for the toned image of FIG. 8a in accordance with the present invention.

FIG. 10 is a representation of a pixel grid with alternative pixel assignments in accordance with the present invention for a letter o.

FIG. 18a is a schematic diagram of pixel designations for a six by six block of pixels in accordance with the present invention.

FIG. 18b is an eight bit digital number representative of the pixel designations of FIG. 18a.

FIG. 18c is schematic diagram of a six by six block of pixels with exemplary pixels marked.

FIG. 18d is a table of pixel designations for 256 possible marking configurations for a six by six block of pixels in accordance with the present invention.

FIGS. 19a-19e are representations of a pixel grid having toned images provided thereon in accordance with the present invention.

FIG. 23 shows a flow diagram illustrating a process of generating a custom tone transfer function according to the present invention.

DETAILED DESCRIPTION

Figure 1A:
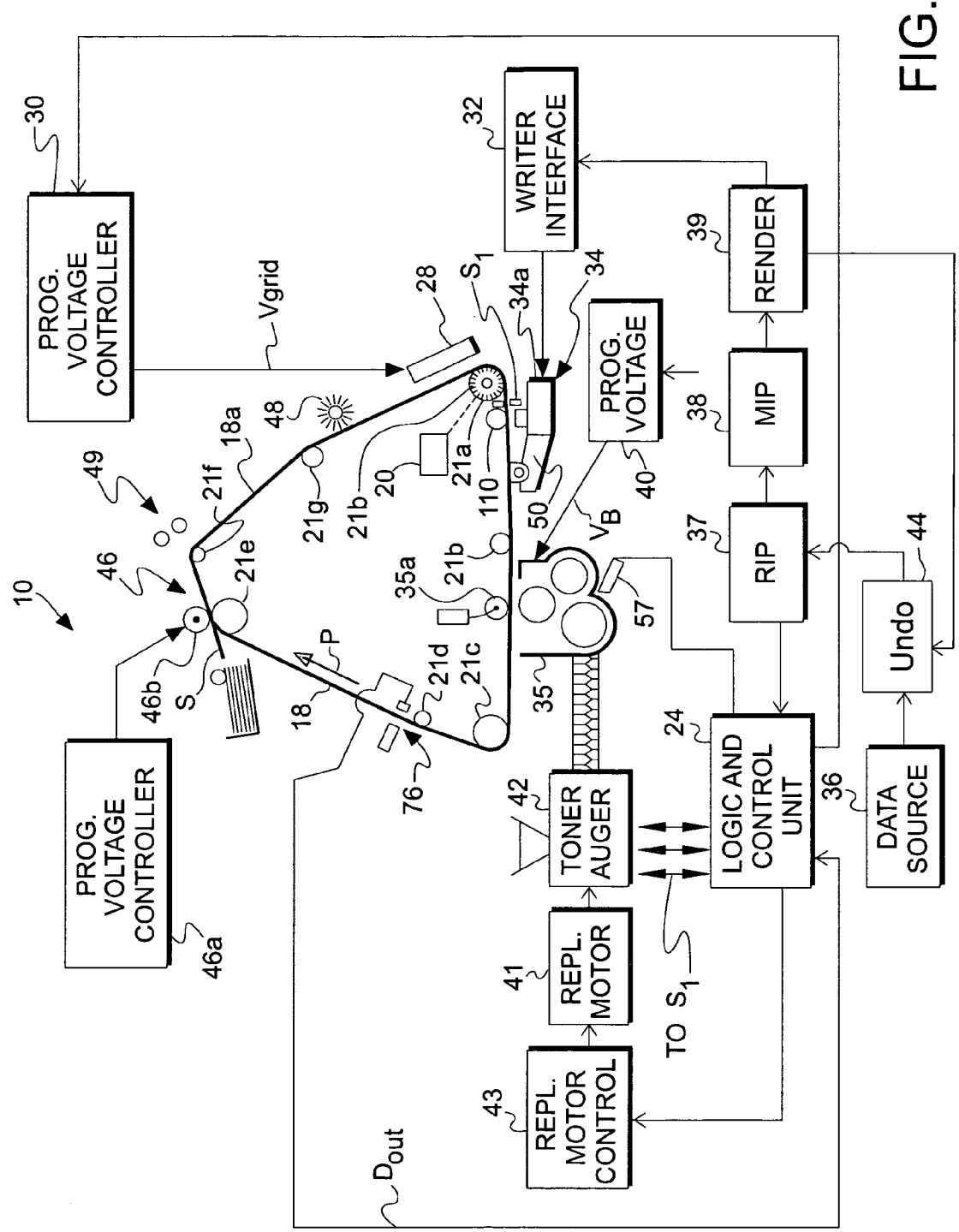
FIGS. 1a-1b are schematic diagrams of an electrographic marking or reproduction system in accordance with the present invention.
Figure 1B:
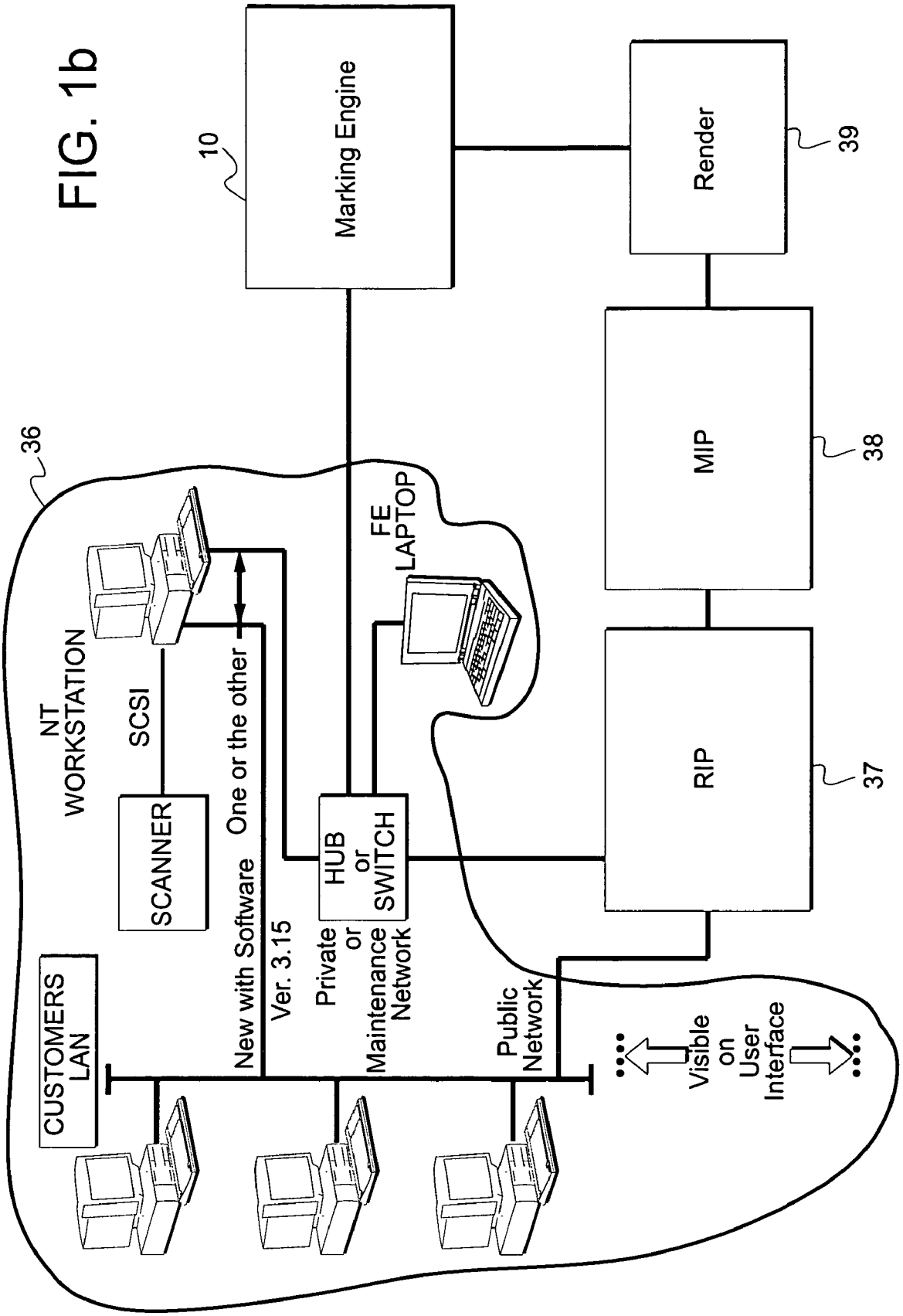

Referring to FIG. 1, a printer machine 10 includes a moving recording member such as a photoconductive belt 18 which is entrained about a plurality of rollers or other supports 21a through 21g, one or more of which is driven by a motor to advance the belt. By way of example, roller 21a is illustrated as being driven by motor 20. Motor 20 preferably advances the belt at a high speed, such as 20 inches per second or higher, in the direction indicated by arrow p, past a series of workstations of the printer machine 10. Alternatively, belt 18 may be wrapped and secured about only a single drum.

Printer machine 10 includes a controller or logic and control unit (LCU) 24, preferably a digital computer or Microprocessor operating according to a stored program for sequentially actuating the workstations within printer machine 10, effecting overall control of printer machine 10 and its various subsystems. LCU 24 also is programmed to provide closed-loop control of printer machine 10 in response to signals from various sensors and encoders. Aspects of process control are described in U.S. Pat. No. 6,121,986 incorporated herein by this reference.

A primary charging station 28 in printer machine 10 sensitizes belt 18 by applying a uniform electrostatic corona charge, from high-voltage charging wires at a predetermined primary voltage, to a surface 18a of belt 18. The output of charging station 28 is regulated by a programmable voltage controller 30, which is in turn controlled by LCU 24 to adjust this primary voltage, for example by controlling the electrical potential of a grid and thus controlling movement of the corona charge. Other forms of chargers, including brush or roller chargers, may also be used.

An exposure station 34 in printer machine 10 projects light from a writer 34a to belt 18. This light selectively dissipates the electrostatic charge on photoconductive belt 18 to form a latent electrostatic image of the document to be copied or printed. Writer 34a is preferably constructed as an array of light emitting diodes (LEDs), or alternatively as another light source such as a Laser or spatial light modulator. Writer 34a exposes individual picture elements (pixels) of belt 18 with light at a regulated intensity and exposure, in the manner described below. The exposing light discharges selected pixel locations of the photoconductor, so that the pattern of localized voltages across the photoconductor corresponds to the image to be printed. An image is a pattern of physical light which may include characters, words, text, and other features such as graphics, photos, etc. An image may be included in a set of one or more images, such as in images of the pages of a document. An image may be divided into segments, objects, or structures each of which is itself an image. A segment, object or structure of an image may be of any size up to and including the whole image.

Image data to be printed is provided by an image data source 36, which is a device that can provide digital data defining a version of the image. Such types of devices are numerous and include computer or microcontroller, computer workstation, scanner, digital camera, etc. These image data sources are at front end and generally include an application program that is used to create or find an image to output. The application program sends the image to the device driver, which serves as an interface between the client and the marking device. The device driver then encodes the image in a page description language ("PDL") and sends the encoded image to the marking device. These data represent the location and intensity of each pixel that is exposed by the printer. Signals from data source 36, in combination with control signals from LCU 24 are provided to a raster image processor (RIP) 37. The digital images (including styled text) are converted by the RIP 37 from their form in a page description language (PDL) language to a sequence of serial instructions for the electrographic printer in a process commonly known as "ripping" and which provides a ripped image to a image storage and retrieval system known as a marking image processor (MIP) 38.

In general, the major roles of the RIP 37 are to: receive job information from the server; parse the header from the print job and determine the printing and finishing requirements of the job; analyze the PDL (page description language) to reflect any job or page requirements that were not stated in the header; resolve any conflicts between the requirements of the job and the marking engine configuration (i.e., RIP time mismatch resolution); keep accounting record and error logs and provide this information to any subsystem, upon request; communicate image transfer requirements to the marking engine; translate the data from PDL (page description language) to raster for printing; and support diagnostics communication between user applications. The RIP accepts a print job in the form of a page description language (PDL) such as postscript, PDF or PCL and converts it into raster, or grid of lines or form that the marking engine can accept. The PDL file received at the RIP describes the layout of the document as it was created on the host computer used by the customer. This conversion process is called rasterization. Another function of the RIP is to perform or create custom transfer functions, such as an UNDO transfer function 44. The UNDO transfer function will be described in greater detail hereinafter. The RIP makes the decision on how to process the document based on what PDL the document is described in. It reaches this decision by looking at the beginning data of the document. A job manager sends the job information to a mss (marking subsystem services) via ethernet and the rest of the document further into the RIP to get rasterized. For clarification, the document header contains printer-specific information such as whether to staple or duplex the job. Once the document has been converted to raster by one of the interpreters, the raster data goes to the MIP 38 via RTS (raster transfer services); this transfers the data over a IDB (image data bus).

The MIP functionally replaces recirculating feeders on optical copiers. This means that images are not mechanically rescanned within jobs that require rescanning, but rather, images are electronically retrieved from the mip to replace the rescan process. The MIP accepts digital image input and stores it for a limited time so it can be retrieved and printed to complete the job as needed. The MIP consists of memory for storing digital image input received from the rip. Once the images are in MIP memory, they can be repeatedly read from memory and output to a RENDER or rendering circuit 39. The amount of memory required to store a given number of images can be reduced by compressing the images; therefore, the images are compressed prior to MIP memory storage, then decompressed while being read from MIP memory.

The output of the MIP is provided to an image RENDER circuit 39, which performs or executes an algorithm which alters the image and provides the altered image to the writer interface 32 (otherwise known as a write head, print head, etc.) Which applies exposure parameters to the exposure medium, such as a photoconductor 18. To this end, RENDER circuit 39 may be described as an algorithm as it may be performed either in hardware, software, or firmware.

After exposure, the portion of exposure medium belt 18 bearing the latent charge images travels to a development station 35. Development station 35 includes a magnetic brush in juxtaposition to the belt 18. Magnetic brush development stations are well known in the art, and are preferred in many applications; alternatively, other known types of development stations or devices may be used. Plural development stations 35 may be provided for developing images in plural grey scales, colors, or from toners of different physical characteristics. Full process color electrographic printing is accomplished by utilizing this process for each of four toner colors (e.g., black, cyan, magenta, yellow).

Upon the imaged portion of belt 18 reaching development station 35, LCU 24 selectively activates development station 35 to apply toner to belt 18 by moving backup roller 35a belt 18, into engagement with or close proximity to the magnetic brush. Alternatively, the magnetic brush may be moved toward belt 18 to selectively engage belt 18. In either case, charged toner particles on the magnetic brush are selectively attracted to the latent image patterns present on belt 18, developing those image patterns. As the exposed photoconductor passes the developing station, toner is attracted to pixel locations of the photoconductor and as a result, a pattern of toner corresponding to the image to be printed appears on the photoconductor. As known in the art, conductor portions of development station 35, such as conductive applicator cylinders, are biased to act as electrodes. The electrodes are connected to a variable supply voltage, which is regulated by programmable controller 40 in response to LCU 24, by way of which the development process is controlled.

Development station 35 may contain a two component developer mix which comprises a dry mixture of toner and carrier particles. Typically the carrier preferably comprises high coercivity (hard magnetic) ferrite particles. As an example, the carrier particles have a volume-weighted diameter of approximately 30μ. The dry toner particles are substantially smaller, on the order of 6μ to 15μ in volume-weighted diameter. Development station 35 may include an applicator having a rotatable magnetic core within a shell, which also may be rotatably driven by a motor or other suitable driving means. Relative rotation of the core and shell moves the developer through a development zone in the presence of an electrical field. In the course of development, the toner selectively electrostatically adheres to photoconductive belt 18 to develop the electrostatic images thereon and the carrier material remains at development station 35. As toner is depleted from the development station due to the development of the electrostatic image, additional toner is periodically introduced by toner auger 42 into development station 35 to be mixed with the carrier particles to maintain a uniform amount of development mixture. This development mixture is controlled in accordance with various development control processes. Single component developer stations, as well as conventional liquid toner development stations, may also be used.

A transfer station 46 in printing machine 10 moves a receiver sheet s into engagement with photoconductive belt 18, in registration with a developed image to transfer the developed image to receiver sheet S. Receiver sheets S may be plain or coated paper, plastic, or another medium capable of being handled by printer machine 10. Typically, transfer station 46 includes a charging device for electrostatically biasing movement of the toner particles from belt 18 to receiver sheet S. In this example, the biasing device is roller 46b, which engages the back of sheet s and which is connected to programmable voltage controller 46a that operates in a constant current mode during transfer. Alternatively, an intermediate member may have the image transferred to it and the image may then be transferred to receiver sheet S. After transfer of the toner image to receiver sheet s, sheet s is detacked from belt 18 and transported to fuser station 49 where the image is fixed onto sheet S, typically by the application of heat. Alternatively, the image may be fixed to sheet s at the time of transfer.

A cleaning station 48, such as a brush, blade, or web is also located behind transfer station 46, and removes residual toner from belt 18. A pre-clean charger (not shown) may be located before or at cleaning station 48 to assist in this cleaning. After cleaning, this portion of belt 18 is then ready for recharging and re-exposure. Of course, other portions of belt 18 are simultaneously located at the various workstations of printing machine 10, so that the printing process is carried out in a substantially continuous manner.

LCU 24 provides overall control of the apparatus and its various subsystems as is well known. LCU 24 will typically include temporary data storage memory, a central processing unit, timing and cycle control unit, and stored program control. Data input and output is performed sequentially through or under program control. Input data can be applied through input signal buffers to an input data processor, or through an interrupt signal processor, and include input signals from various switches, sensors, and analog-to-digital converters internal to printing machine 10, or received from sources external to printing machine 10, such from as a human user or a network control. The output data and control signals from LCU 24 are applied directly or through storage latches to suitable output drivers and in turn to the appropriate subsystems within printing machine 10.

Process control strategies generally utilize various sensors to provide real-time closed-loop control of the electrostatographic process so that printing machine 10 generates "constant" image quality output, from the user's perspective. Real-time process control is necessary in electrographic printing, to account for changes in the environmental ambient of the photographic printer, and for changes in the operating conditions of the printer that occur over time during operation (rest/run effects). An important environmental condition parameter requiring process control is relative humidity, because changes in relative humidity affect the charge-to-mass ratio q/m of toner particles. The ratio q/m directly determines the density of toner that adheres to the photoconductor during development, and thus directly affects the density of the resulting image. System changes that can occur over time include changes due to aging of the printhead (exposure station), changes in the concentration of magnetic carrier particles in the toner as the toner is depleted through use, changes in the mechanical position of primary charger elements, aging of the photoconductor, variability in the manufacture of electrical components and of the photoconductor, change in conditions as the printer warms up after power-on, triboelectric charging of the toner, and other changes in electrographic process conditions. Because of these effects and the high resolution of modern electrographic printing, the process control techniques have become quite complex.

Process control sensor may be a densitometer 76, which monitors test patches that are exposed and developed in non-image areas of photoconductive belt 18 under the control of LCU 24. Densitometer 76 measures the density of the test patches, which is compared to a target density. Densitometer may include an infrared or visible light led, which either shines through the belt or is reflected by the belt onto a photodiode in densitometer 76. These toned test patches are exposed to varying toner density levels, including full density and various intermediate densities, so that the actual density of toner in the patch can be compared with the desired density of toner as indicated by the various control voltages and signals. These densitometer measurements are used to control primary charging voltage $V_o$, maximum exposure light intensity $E_o$, and development station electrode bias $V_b$. In addition, the process control of a toner replenishment control signal value or a toner concentration setpoint value to maintain the charge-to-mass ratio q/m at a level that avoids dusting or hollow character formation due to low toner charge, and also avoids breakdown and transfer mottle due to high toner charge for improved accuracy in the process control of printing machine 10. The toned test patches are formed in the interframe area of belt 18 so that the process control can be carried out in real time without reducing the printed output throughput. Another sensor useful for monitoring process parameters in printer machine 10 is electrometer probe 50, mounted downstream of the corona charging station 28 relative to direction p of the movement of belt 18. An example of an electrometer is described in U.S. Pat. No. 5,956,544 incorporated herein by this reference.

Other approaches to electrographic printing process control may be utilized, such as those described in international publication number WO 02/10860 a1, and international publication number WO 02/14957 A1, both commonly assigned herewith and incorporated herein by this reference.

Raster image processing begins with a page description generated by the computer application used to produce the desired image. The raster image processor interprets this page description into a display list of objects. This display list contains a descriptor for each text and non-text object to be printed; in the case of text, the descriptor specifies each text character, its font, and its location on the page. For example, the contents of a word processing document with styled text is translated by the RIP into serial printer instructions that include, for the example of a binary black printer, a bit for each pixel location indicating whether that pixel is to be black or white. Binary print means an image is converted to a digital array of pixels, each pixel having a value assigned to it, and wherein the digital value of every pixel is represented by only two possible numbers, either a one or a zero. The digital image in such a case is known as a binary image. Multi-bit images, alternatively, are represented by a digital array of pixels, wherein the pixels have assigned values of more than two number possibilities. The RIP renders the display list into a "contone" (continuous tone) byte map for the page to be printed. This contone byte map represents each pixel location on the page to be printed by a density level (typically eight bits, or one byte, for a byte map rendering) for each color to be printed. Black text is generally represented by a full density value (255, for an eight bit rendering) for each pixel within the character. The byte map typically contains more information than can be used by the printer. Finally, the RIP rasterizes the byte map into a bit map for use by the printer. Half-tone densities are formed by the application of a halftone "screen" to the byte map, especially in the case of image objects to be printed. Pre-press adjustments can include the selection of the particular halftone screens to be applied, for example to adjust the contrast of the resulting image.

Electrographic printers with gray scale printheads are also known, as described in international publication number WO 01/89194 a2, incorporated herein by this reference. The rendering algorithm groups adjacent pixels into sets of adjacent cells, each cell corresponding to a halftone dot of the image to be printed. The gray tones are printed by increasing the level of exposure of each pixel in the cell, by increasing the duration by way of which a corresponding led in the printhead is kept on, and by "growing" the exposure into adjacent pixels within the cell.

Ripping is printer-specific, in that the writing characteristics of the printer to be used is taken into account in producing the printer bit map. For example, the resolution of the printer both in pixel size (dpi) and contrast resolution (bit depth at the contone byte map) will determine the contone byte map. As noted above, the contrast performance of the printer can be used in pre-press to select the appropriate halftone screen. RIP rendering therefore incorporates the attributes of the printer itself with the image data to be printed.

The printer specificity in the RIP output may cause problems if the RIP output is forwarded to a different electrographic printer. One such problem is that the printed image will turn out to be either darker or lighter than that which would be printed on the printer for which the original RIP was performed. In some cases the original image data is not available for re-processing by another RIP in which tonal adjustments for the new printer may be made.

Figure 2:
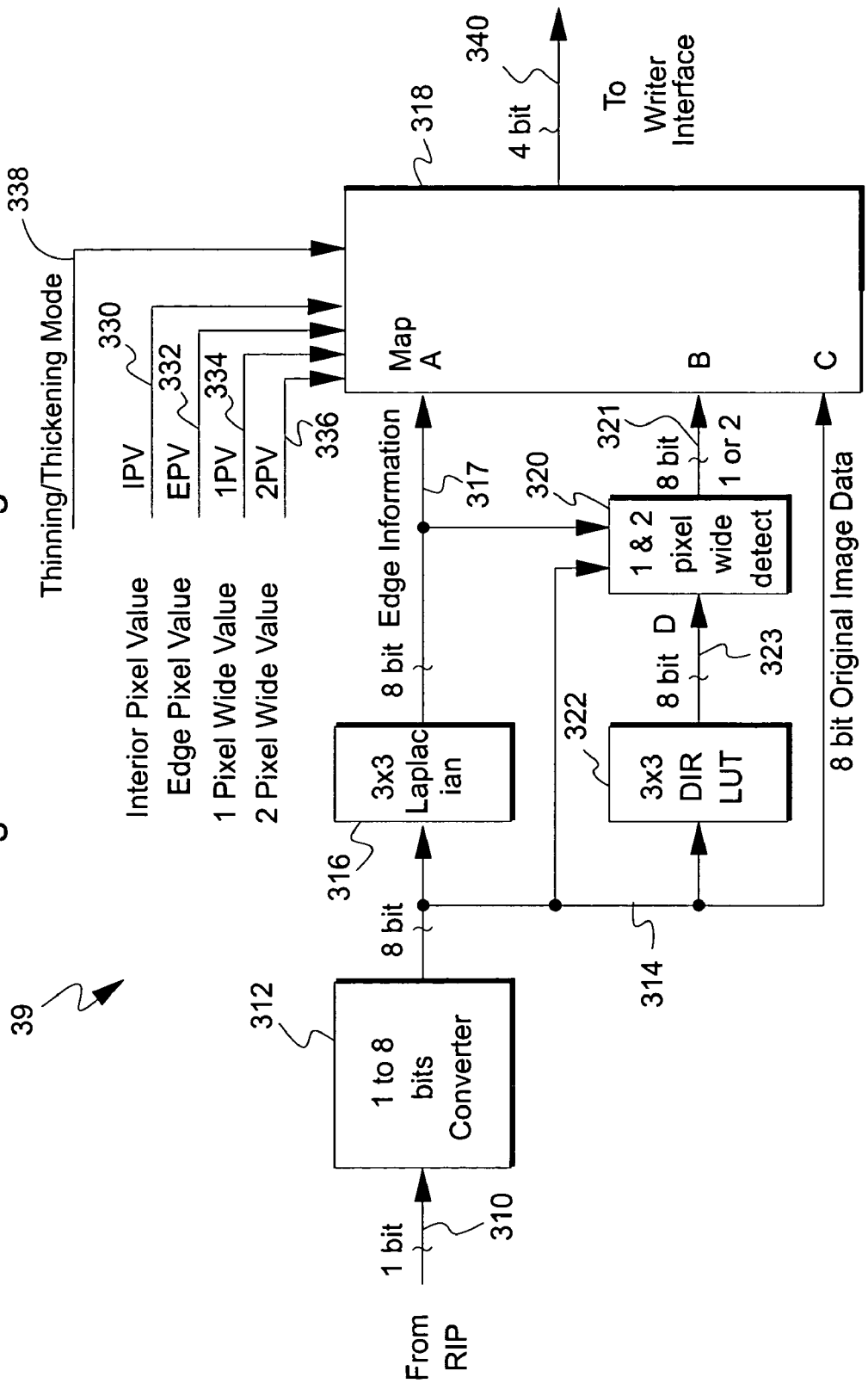
FIG. 2 is a schematic block diagram for image rendering in accordance with the present invention.

FIG. 2 illustrates a schematic block diagram of the function of RENDER circuit 39. For exemplary purposes only, it is assumed that binary image data is provided by the RIP on line 310 to converter circuit 312 which, in this example, converts the data from binary to multi-bit data, such as eight bit data. For example, the pixel value may be converted from a 1 or 0 value, to a value ranging from 0 to 255 and provided on a line 314. For simplicity, it will be assumed that the pixel being treated or the pixel in question (PIQ) values on line 314 is either 0 or 255. The 8 bit PIQ value is provided to an edge determination circuit 316 which applies a standard 3×3 edge Laplacian kernel circuit to determine if the PIQ is an edge pixel. The results (a) of this edge determination is provided on a line 317 to mapping circuit 318 and a pixel object width determination circuit 320. In other terminology, circuit 316 flags whether the PIQ is edge pixel or not. An edge is defined as a transition between background and foreground. Edge pixels define the transition between background and foreground pixels. Background pixels are defined as pixels having relatively little or no marking information within. Print or marking information is the digital value assigned to the pixel which results in a certain amount of marking material, such as ink or toner, to be deposited on a receiver, where the amount of material has a functional relationship to the digital value. For example, in the present embodiment, higher digital values may mean higher amounts of toner being deposited, resulting in a visually darker pixel. An inverse relationship could also be employed, however. Foreground pixels are defined as pixels having some printable or marking information within. Foreground pixels may be either interior pixels, edge pixels, one line pixels, or two line pixels. Interior pixels are foreground pixels that are not edge pixels, one line pixels, or two line pixels.

Figure 4:
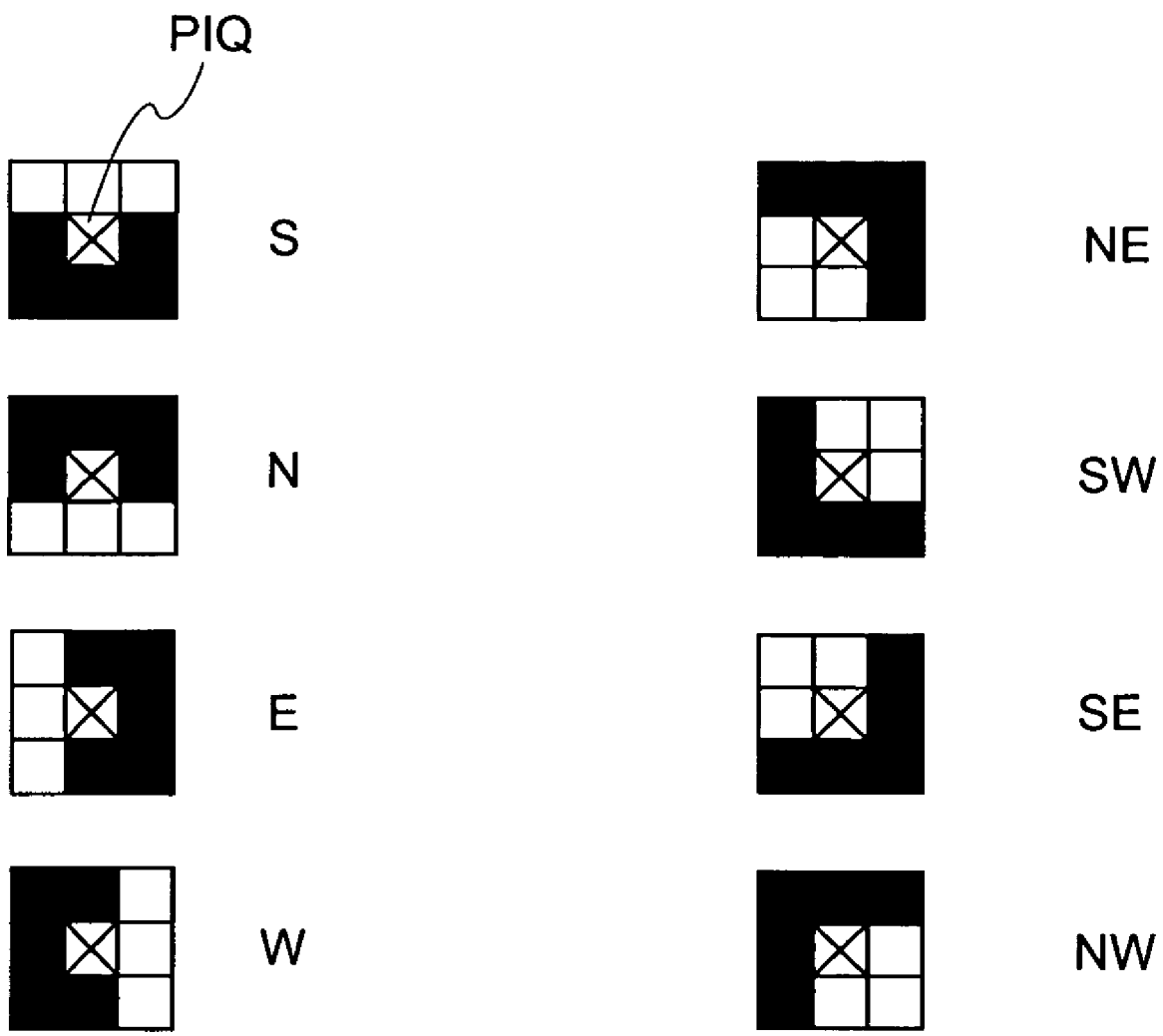
FIG. 4 is a schematic diagram of eight examples of directional values assigned to pixels surrounding a pixel in question.

The output on line 314 from converter circuit 312 is also provided to a 3×3 directional look up table circuit 322. Circuit 322 assigns a direction value to each pixel. The directional assignment is determined by the values of the eight pixels surrounding the pixel. FIG. 4 illustrates an example of eight possible unique directional assignments (N, NE, NW, S, SE, SW, E, W). The letter designations indicate the direction of the adjoining pixels. One way to interpret the letter designations is to consider where the mass of adjoining black pixels are relative to the center pixel in the 3×3. For example, the n assignment is that the direction of adjoining pixels relative to the pixel in question is that they lie to the north of it. Since there are 8 pixels surrounding the pixel in question in a 3×3 region, there are 256 possible pixel combinations. Each pixel combination yields one of the 8 possible directional values or a zero. A zero (or other designated value) indicates that none of the directional values apply. FIG. 18d provides the complete 256-entry table. Note that each LUT entry is assigned one of nine possible directional descriptive assignment (eight examples of which are shown in FIG. 4). Other letters or numerical designations may just as well have been assigned. The output (D) of the directional LUT circuit 322 is provided on line 323 to character or object pixel width determination circuit 320.

Pixel width determination circuit 320 determines if the edge PIQ is part of an object that is one or two pixels wide, and flags the data with a tag (B) accordingly on a line 321. The tag can take on one of three states or values. The PIQ can be part of a one pixel wide object, a two pixel wide object, or neither. Any number of algorithms can be utilized to perform this determination. The present invention uses information obtained from the directional LUT block 322, in which the detection circuit examines the directional value of pixels surrounding the PIQ to identify pixels that are part of a one or two pixel wide object, or neither. Refer to FIGS. 7 and 8.

The following represents pseudo code for 1 pixel wide line pixel value assignment decisions in accordance with the exemplary algorithm for block 320 of FIG. 2:

If pixel from a is an edge pixel and pixel value from DIR LUT is 0,
Then pixel is part of 1 pixel wide line.

The following represents pseudo code for a 2 pixel wide line pixel value assignment decisions in accordance with exemplary algorithm for block 320 of FIG. 2:

If pixel from a is an edge pixel,
Then if pixel from DIR LUT is a E and if adjacent pixel to the right is a W
    Then pixel is part of a two pixel wide line
Else if pixel from DIR LUT is a SE and if pixel on next line and to the right is a NW
    Then pixel is part of a two pixel wide line
Else if pixel from DIR LUT is a s and if pixel on next line and directly below is a N
    Then pixel is part of a two pixel wide line
Else if pixel from DIR LUT is a SW and if pixel on next line and to left is a NE
    Then pixel is part of a two pixel wide line
Else if pixel from DIR LUT is a W and if adjacent pixel to the left is a E
    Then pixel is part of a two pixel wide line
Else if pixel from DIR LUT is a NW and if pixel on previous line and to left is a SE
    Then pixel is part of a two pixel wide line
Else if pixel from DIR LUT is a N and if pixel on previous line and directly above is S
    Then pixel is part of a two pixel wide line
Else if pixel from DIR LUT is a NE and if pixel on previous line and to right is a SW
    Then pixel is part of a two pixel wide line
Else pixel is an edge pixel Mapping circuit 318 is provided information from multiple sources and provides an output on a line 340 to the writer interface. The inputs to mapping circuit are the edge detection pixel information a on line 317, object width information B on a line 321, and original image PIQ data C on line 314. In addition, assignment values for interior pixels, edge pixels, one pixel wide lines, two pixel wide lines and whether the algorithm is in a thinning or thickening mode are provided to mapping circuit 318 on lines 330, 332, 334, 336 and 338. These assignment values are new values that will be given to the PIQ, depending upon whether the PIQ is part of a two pixel wide object (2PV), or if the PIQ is part of a one pixel wide object (1PV), or if the PIQ is an edge pixel of an object more than two pixels wide (EPV), and another value if the PIQ is an interior (not background) pixel (IPV). Background pixels (white area) are not changed by this particular algorithm, although another might do so to achieve a desired effect.

The types of assignment parameters and the number of assignment values may be determined in an unlimited number of ways. For example, they may be provided by a user in response to a particular effect the print operator wishes to obtain by programming through a user interface, mechanical switches or other adjustments. The assignment values may also be determined automatically by the controller or LCU in response to printer operational parameters, operator input or other input. The assignment values and parameters may be combined to determine new assignment parameters. However they may be determined, new pixel tone or exposure values will be assigned to the PIQ post rip. One primary factor in new pixel tone value assignment is the location of the PIQ in the image in relation to surrounding pixels. Although the input to the RENDER circuit 39 is explained as a binary input, the input may also be a multi-bit input wherein new multi-bit PIQ exposure values will be assigned for the input PIQ exposure values.

RENDER circuit 39 is an in line interface, or serial interface in that it is provided between the RIP and the writer interface. Image rendering can therefore be accomplished independent of the printer or other printer components discussed hereinbefore, such as the RIP or writer interface. It may be implemented with hardware (such as a computer or processor board), software, or firmware as those terms are known to those skilled in the art. The image rendering of the present invention can also be accomplished utilizing data from the other printer components, such as data typically utilized for process control. In addition, image rendering may be set or programmed by an operator or other external or remote source in order to achieve a particular effect or effects in the printed output. Implementing a rendering circuit in hardware just prior to gray level writer allows for lower bandwidth requirements right up to last stage before exposure. The writer may be any grey level exposure system.

Figure 3:
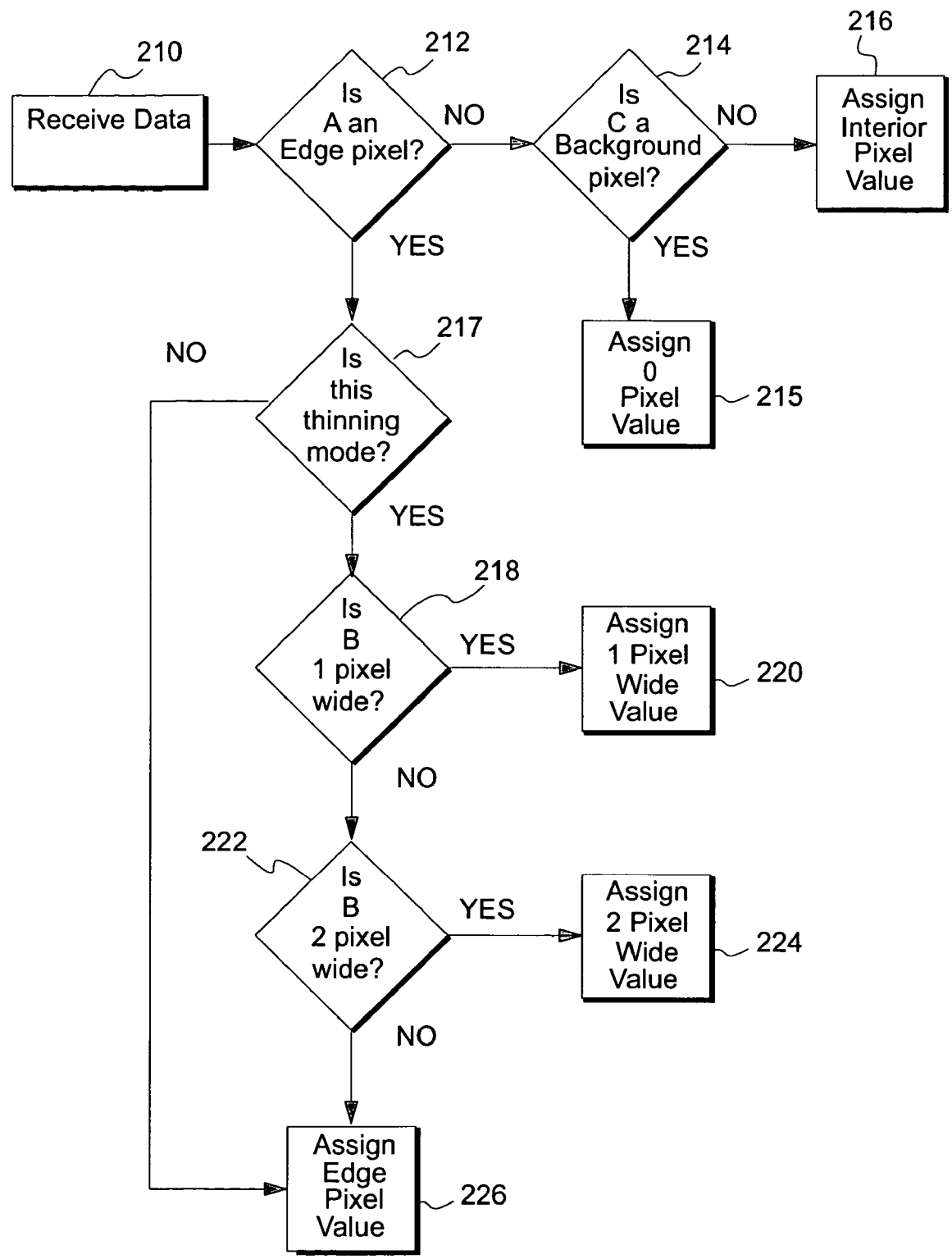
FIG. 3 is a flow chart for image rendering in accordance with the present invention.

Referring to FIG. 3, a flowchart of a mapping function performed by circuit 318 is provided. Data is provided by blocks 312, 316, 322 and on lines 330, 332, 334, 336 and 338. In a first step 210, binary image data is received from the data source 36, preferably after it has been ripped by the RIP 37. In a step 212, the mapping function determines whether the pixel being treated or the pixel in question (PIQ) is an edge pixel. Edge pixels of binary images may be detected using any of a number of standard algorithms known in the art (William k. Pratt, digital image processing, second edition, John Wiley and sons, 1991, chapter 16). The edge can be the white edge or black edge. The black edge is used for "thinning" or lightening and the "white edge" is used for thickening or darkening. To detect black edges, the binary image is converted to 8 bits (e.g. 0-->0 and 1-->255) and a standard 3×3 edge Laplacian kernel is applied. Preferred embodiment uses the following kernel:

$$\begin{array}{ccc} 0 & -1 & 0 \\ -1 & 4 & -1 \\ 0 & -1 & 0 \end{array}$$

The result of this operation is an image in which all image pixels are 0 except for edge pixels which have a value of 255. To detect white edges, the binary image is converted to 8 bits and inverted (e.g. 0-->255 and 1-->0). White edges of text and other features are detected when the image is to be darkened or lines and halftones dots are to be made wider. The white pixel edges are then replaced with a gray level to widen or extend the exposed region. The amount of gray level added determines the degree to which the image is darkened. The particular edge detection algorithm utilized can be combinations and refinements of standard algorithms known in the art. In a thinning case, changing the edge pixels of each halftone cell to gray lightens the printed pictorial image. In a thickening case, adding gray to the white edge pixels around the halftone cell darkens the image.

If the PIQ is determined not to be an edge pixel, then in a step 214, the determination is made whether the PIQ value is zero or something other than zero. If the PIQ value is zero, then the PIQ value is assigned the background pixel value BPV, (which for exemplary purposes in this case is zero) in a step 215, since it is part of the background. If the PIQ value is not zero then it's assumed it's an interior pixel (solid area pixel) and a new interior pixel value (IPV) is assigned to it in a step 216.

If the PIQ in step 212 was determined to be an edge pixel, a step 217 determines whether the image rendering is in a thinning mode or a widening mode. These modes will be discussed in more detail hereinafter. If a thinning mode is desired, then a determination is made in a step 218 as to whether the PIQ is an edge pixel of a line or object that is one pixel wide. If yes, then the PIQ is assigned a new one pixel wide value (1PV) in a step 220. If the answer to step 218 is no, then a determination is made in a step 222 whether the PIQ is part of a line or object that is two pixels wide. If yes in step 222, then a two pixel wide value (2PV) is assigned to the PIQ in a step 224. If no, then the edge pixel value (EPV) is assigned to the PIQ in a step 226.

If the answer to step 217 is no, then the PIQ is assigned an edge pixel value (EPV) in a step 226.

It is to be noted that the flowchart of FIG. 3 may be an algorithm that is performed as part of the mapping circuit 318 or function as illustrated in FIG. 2. Also, as can be seen in FIG. 2, binary pixel data is provided by the RIP to the input of the image RENDER circuit and multi-bit pixel data is output to the writer. Variations of how the data is converted, and what values are assigned to the different pixels are limitless and depend on what alterations to printed images is desired by the user. Also, it can be seen that the rendering algorithm begins with or is based on detecting edges or edge pixels.

One implementation of this invention uses directional value assigned by the LUT block to further classify an edge pixel by direction. Edge pixels can be identified as pixels that occur at specific orientations relative to the objects which they border. This can be accomplished in the map block 318 of FIG. 2 by providing directional information for the PIQ from line 323. When a PIQ is determined to be an edge pixel, examining the directional value assigned by block 322 for that pixel can further refine the edge classification. In this way, unique values can be assigned to edge pixels that are designated as one of the eight unique directional values. In such an enhanced implementation, line 332 into block 318 would consist of eight unique assignment values, one for each of the eight directional edge values. These can then take on any combination of values including the same value. As an example, all pixels with a N, NE and NW orientation may require more aggressive thinning than pixels with other orientations. In such an instance, all N, NE, NW edge pixels could be assigned a grey level different from the remaining edge pixels. There may be any number of applications or reasons to assign different values to edge pixels based on orientation of surrounding pixels.

Referring to FIG. 4, a binary bitmap of eight different relational configurations or objects in a 3×3 array of pixels are defined as to where the PIQ located with relation to the surrounding object. In each array, the center pixel is considered the PIQ. The eight possibilities are provided through a directional look up table (DIR LUT) or directional LUT. Eight variable values S, N, E, W, NE, SW, SE, NW are assigned the eight configurations. It is to be noted that FIG. 4 illustrates only eight of 256 possible combinations of pixel patterns surrounding the PIQ. In the present example though, other combinations result in one of the eight relational assignments or zero, (zero indicates that none of the directional assignments apply). In this manner, determination of the orientation of the PIQ with respect to adjacent pixels can be made.

As described hereinbefore, the RIP provides image data to a RENDER circuit 39. The RIP 37 and RENDER circuit 39 can be dedicated hardware, or a software routine such as a printer driver, or some combination of both, for accomplishing this task.

The RENDER circuit 39 algorithm defines, classifies or identifies each pixel as a particular kind of pixel and reassigns pixel values as a function of their classification, where the different classification reassignment values may be independent of each other. For example, the algorithm may classify each pixel as either a background pixel, interior pixel, edge pixel, one line pixel, or two line pixel and reassign new values to these pixels according to those classifications and independent of the each other. For example, interior pixels may be reassigned new values while edge pixel remained unchanged, or edge pixels may be reassigned new values while leaving interior pixels unchanged, or edge pixel values may be lowered with respect to interior pixel values, or interior pixel values may be lowered with respect to edge pixel values, etc. It can be seen there are unlimited variations to the present rendering algorithm. Examples of the many pixel classifications or assignments that may be assigned are defined herein with the designations background pixel (BP), foreground pixel (FP), interior pixel (IP), edge pixel (EP), one line pixel (1W), two line pixel (2W), N, S, E, W, NE, NW, SE, SW, Y, Z, etc.

Figure 6A:
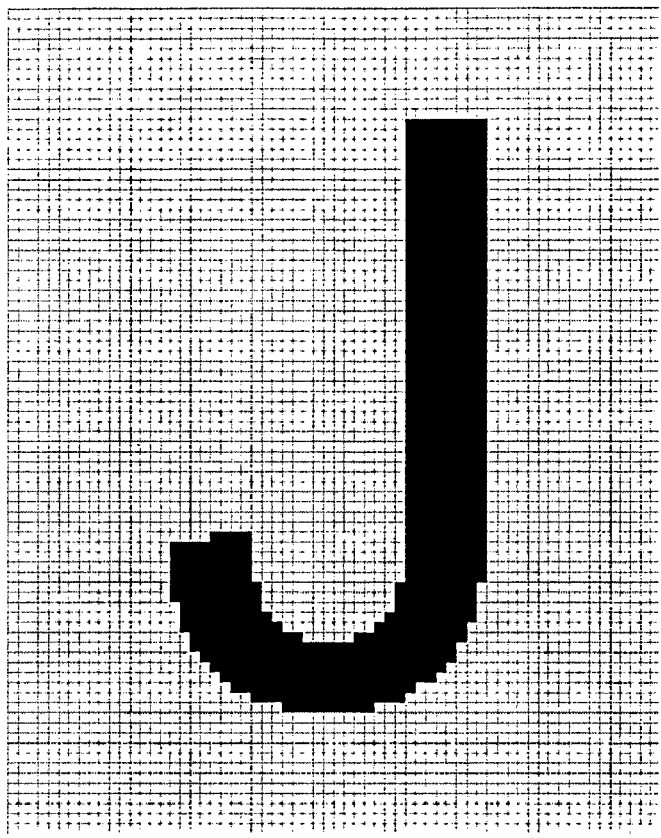
FIGS. 6a-6f are representations of a pixel grid having an image provided thereon in accordance with the present invention.

Referring to FIGS. 6a-6f, wherein a character is represented in a pixel grid. FIG. 6a is an illustration of a binary bitmap of a character. It can be seen that the pixels are either all black (filled with solid area density of maximum toner Dmax) or have no toner and have area toner density of zero.

Figure 6B:
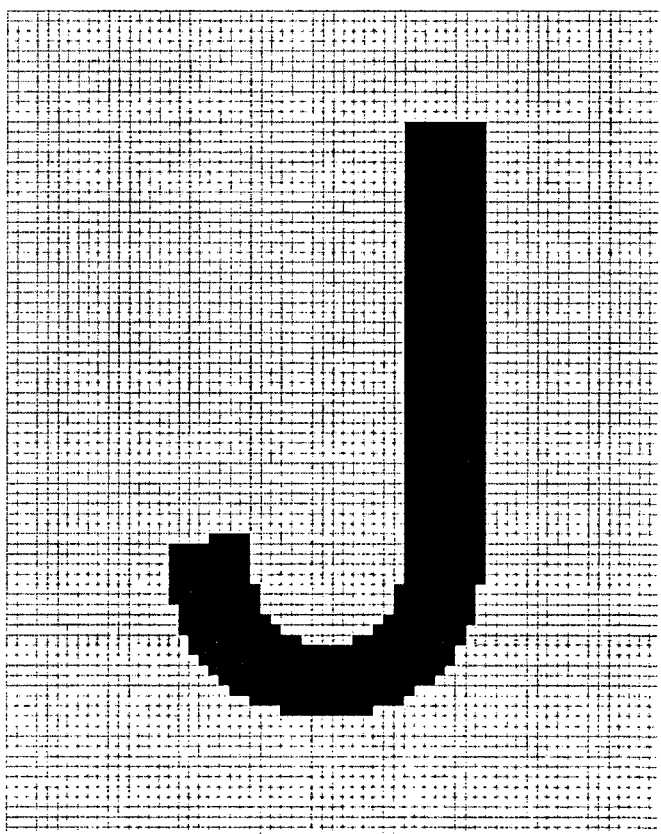

FIG. 6b illustrates the toned character of 6a after assigning a lower pixel value to both interior pixels and edge pixels. In other words, IPV and EPV were reassigned from Dmax in FIG. 6a to Dx, where Dx is lower than Dmax.

Figure 6C:
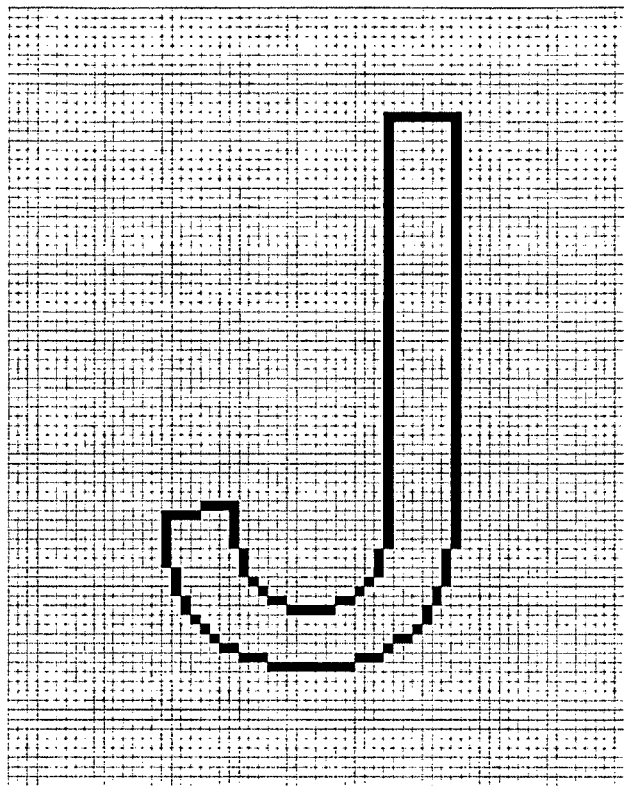

FIG. 6c illustrates the edge pixels of the character when the character is undergoing thinning.

Figure 6D:
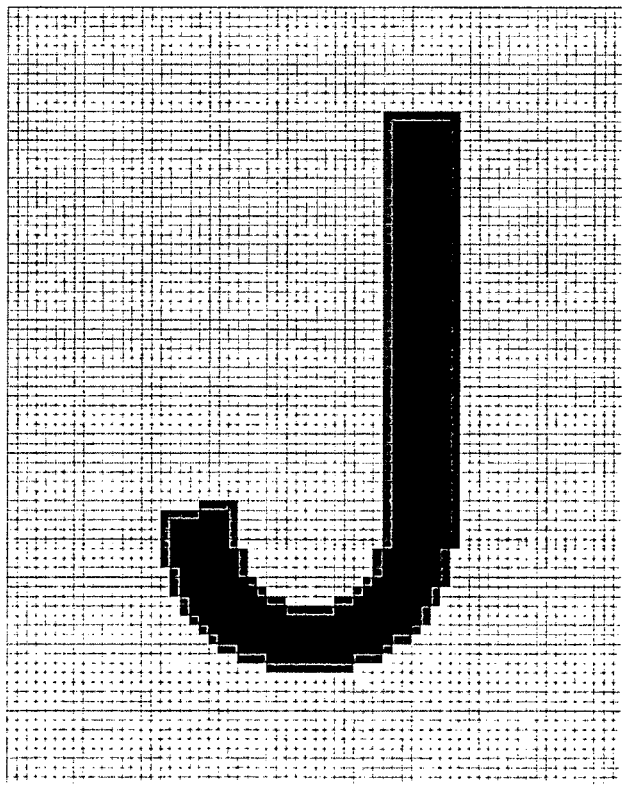

FIG. 6d illustrates assignment of new EPV and IPV values for the edge and interior pixels of the character after thinning has occurred.

Figure 6E:
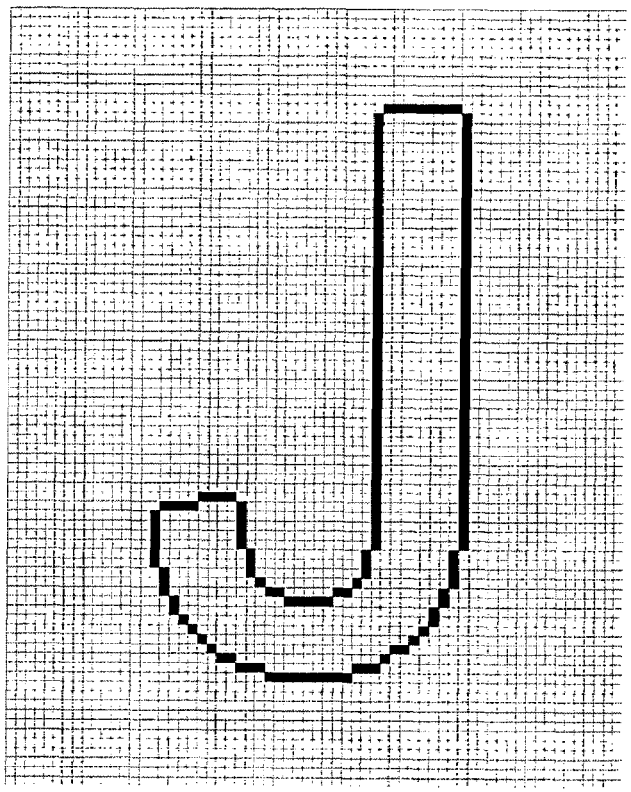

FIG. 6e illustrates the edge pixels of the character when the character is undergoing thickening.

Figure 6F:
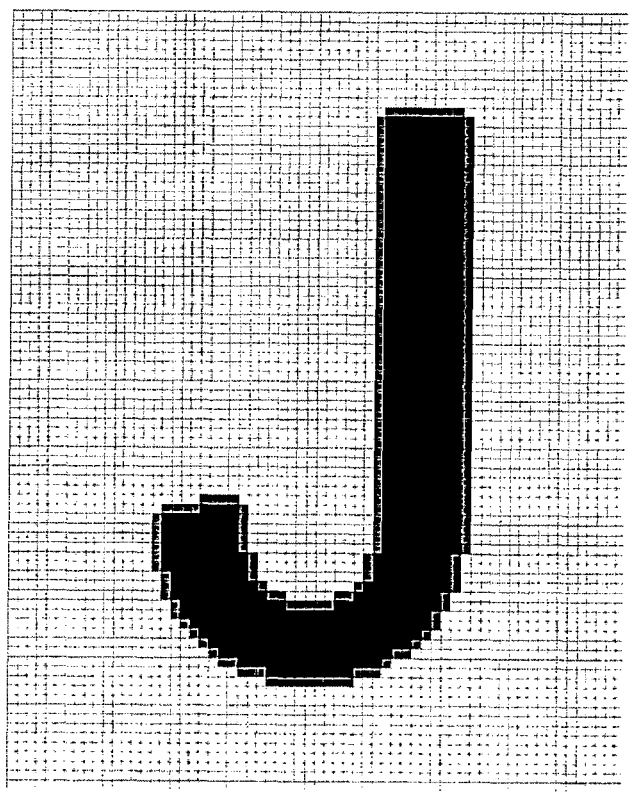

FIG. 6f illustrates assignment of new EPV and IPV values for the edge and interior pixels of the character after thickening has occurred.

It can be seen from these Figures that after operation of the algorithm, the edge pixels and interior pixels may be assigned grey levels (or marking values) independently. Once edge pixels are detected, the remaining pixels consist of either "background" pixels (white unprinted area) or "interior" pixels (foreground less edge pixels). Interior pixels can be distinguished from background pixels in that if a pixel is not an edge pixel (from above) and if in the original image data the pixel is a 0 (no marking) then the pixel is a background pixel. On the other hand, if the pixel is not a edge pixel (from above) and if in the original image data the pixel is a 1 (marking) then the pixel is an interior pixel. With the RENDER circuit, the exposure level of interior pixels can be changed. Second and subsequent layers of edge pixels can be detected by simply performing the edge detection algorithm on the interior pixels which remain after the edge pixels are removed. Interior pixels would then refer to pixels remaining after all layers of edge pixels have been removed. A flow chart for this type of iteration is illustrated in FIG. 17.

Figure 17:
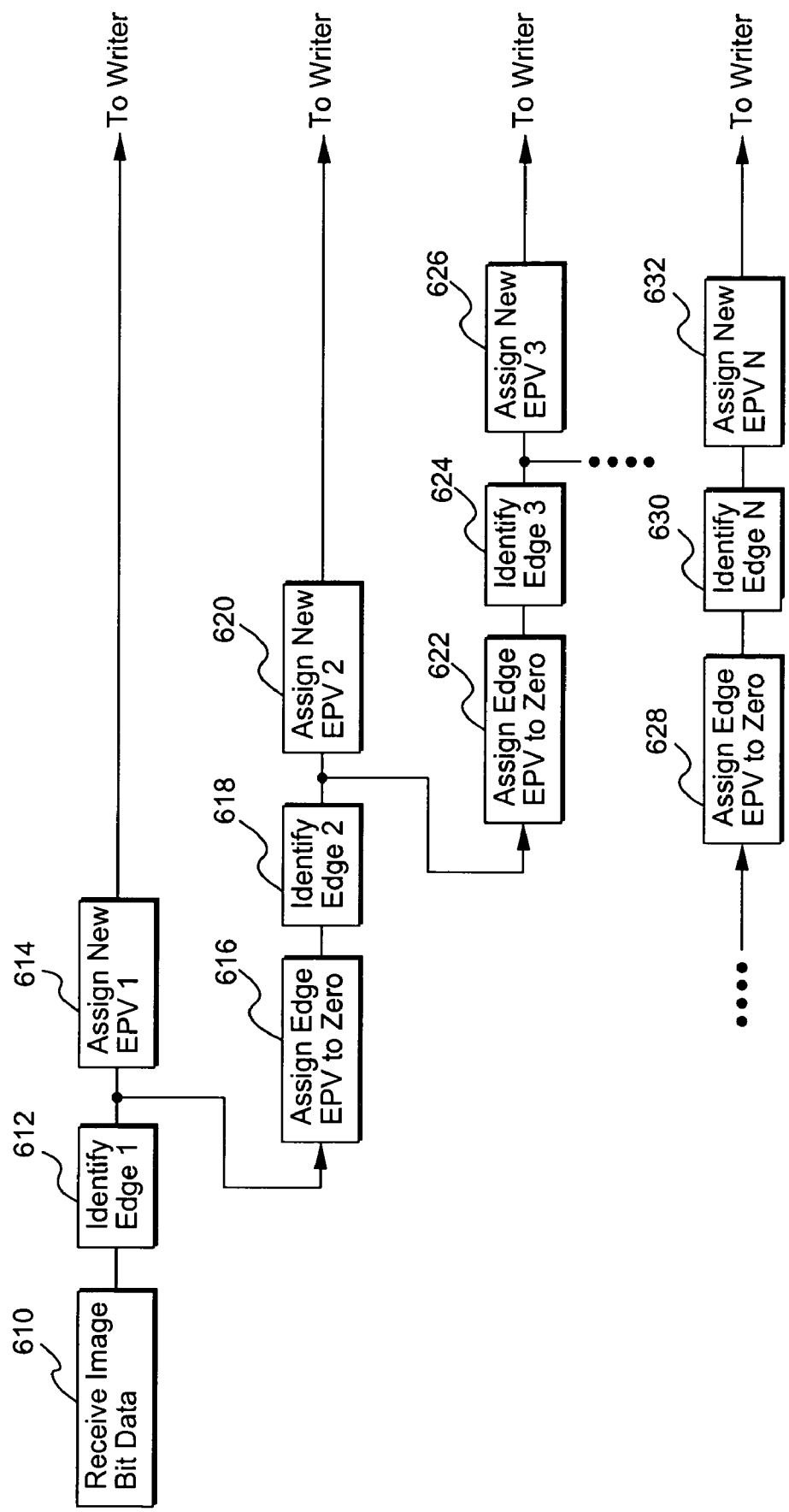
FIG. 17 is a flow chart illustrating the steps taken to thin an object by more than one pixel, in accordance with the present invention.

The steps taken in FIG. 17 begin with step 610 of receiving image bitmap data. In a step 612, the edge pixels are identified and assigned a new value EPV1 in a step 614 and thereafter sent to the writer. The EDGE 1 pixels identified in step 612 are also assigned a value of zero in a step 616, thereby creating a new "virtual" edge 2. The EDGE 2 pixels are identified in a step 618 and reassigned a new pixel value EPV2 in a step 620 and thereafter sent to the writer. The EDGE 2 pixels identified in step 618 are also assigned a value of zero in a step 622, thereby creating a new "virtual" edge 3. The EDGE 3 pixels are identified in a step 624 and reassigned a new pixel value EPV3 in a step 626 and thereafter sent to the writer. This process can be iterated many times over so that edge n−1 pixels are assigned a value of zero in a step 628, thereby creating a new "virtual" edge n. The EDGE N pixels are identified in a step 630 and reassigned a new pixel value EPVN in a step 632 and thereafter sent to the writer.

A process similar to that described above process may be utilized to thicken or expand the size of an object edges by simply assigning a value higher than zero, such as one or Dmax in steps 616, 622, 628, etc. In order to create a new edge, real or virtual.

FIGS. 5a-5d illustrate different alterations that may be accomplished using an iterative edge detection.

Figure 5A:
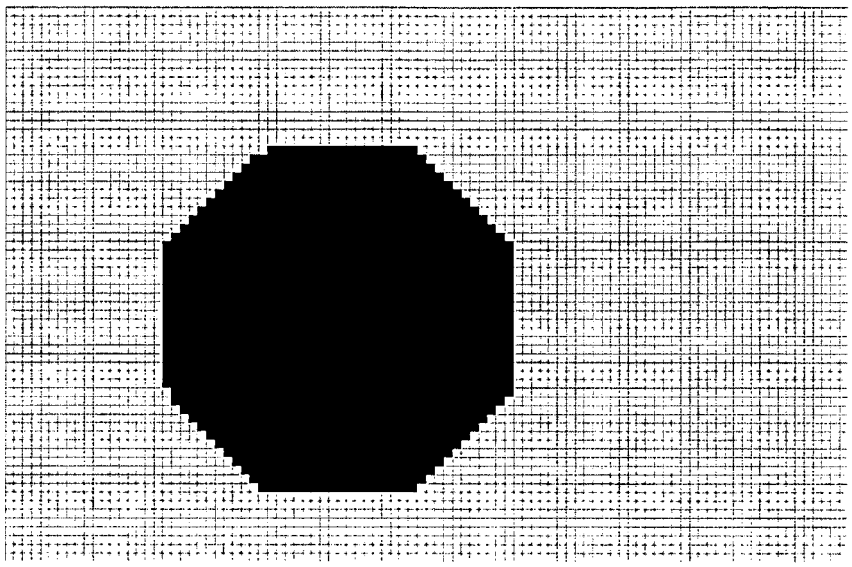
FIGS. 5a-5d are representations of a pixel grid having a toned image provided thereon in accordance with the present invention.
Figure 5B:
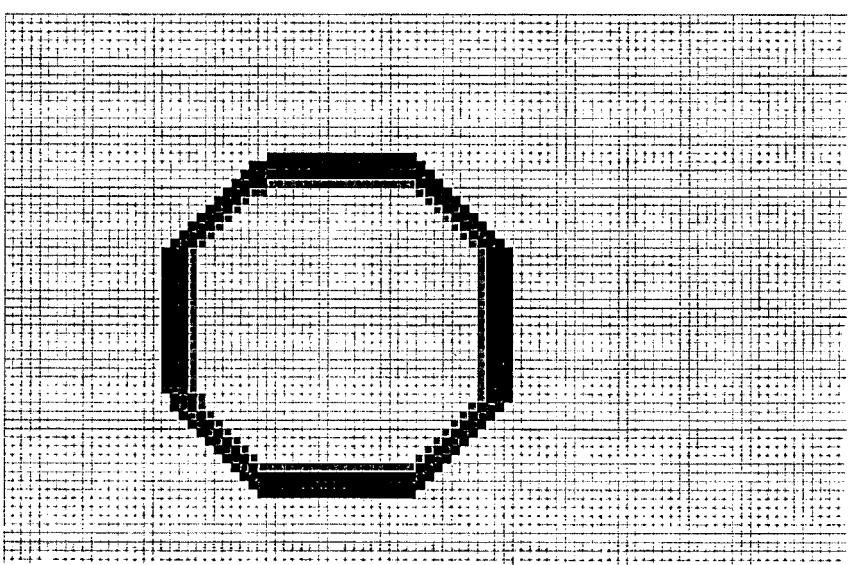
Figure 5C:
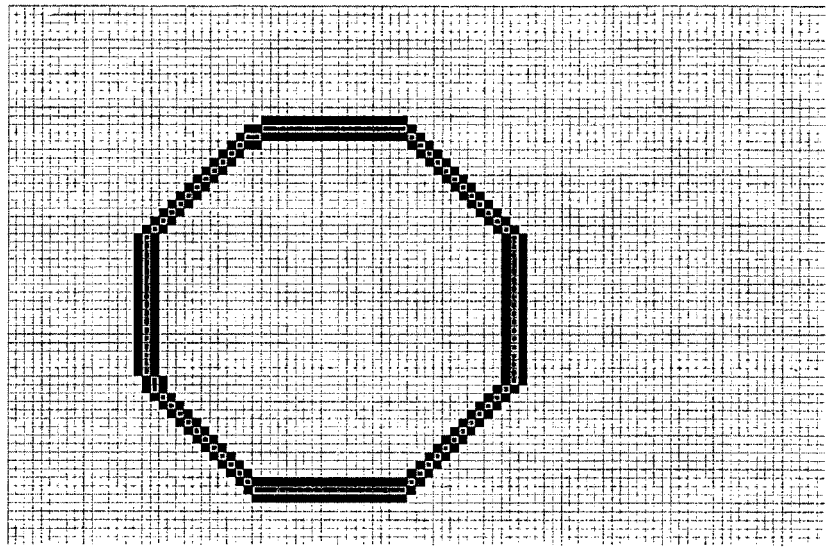
Figure 5D:
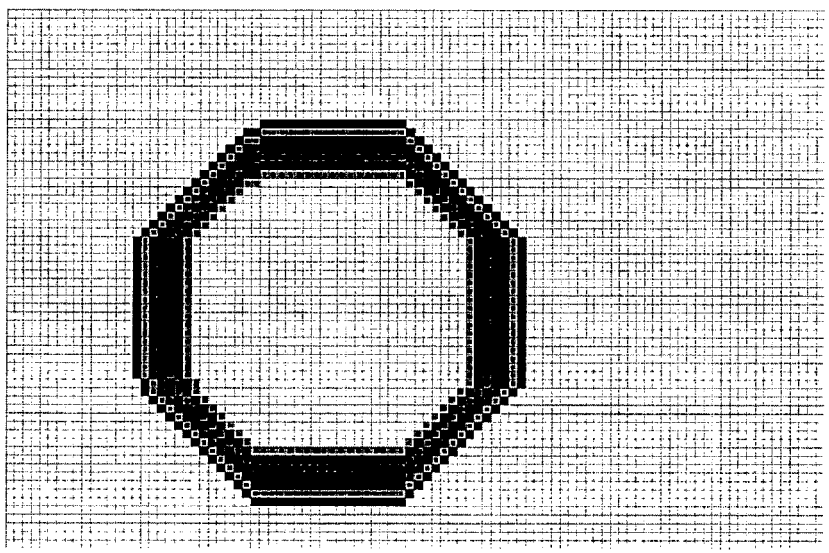

FIG. 5a illustrates the original object. FIG. 5b illustrates four layers of edge pixels identified by iteratively thinning. The outermost layer representing the edge pixels of the original object. FIG. 5c illustrates three layers of edge pixels when iteratively thickening. The innermost layer represents the edge pixels just outside of the original object. FIG. 5d illustrates the combined layers of FIGS. 5b and 5c.

Referring to FIGS. 7a-7d in conjunction with FIGS. 2 and 3, wherein a single pixel width character or line is represented in a pixel grid. FIG. 7a is an illustration of a binary bitmap of a one pixel wide character. It can be seen that the pixels are either all black (filled with solid area density of maximum toner Dmax) or have no toner and have area toner density of zero. FIG. 7b illustrates assignment of eight bit values for the binary values of FIG. 7a after determination of the edge pixels according to a laplacian kernel. FIG. 7c illustrates assignment of direction values for the pixels surrounding character pixels after application of the directional assignment algorithm of block 322 of FIG. 2 and LUT of FIG. 18d. FIG. 7d illustrates the assignment of background pixel, edge pixel and direction values for the pixel grid in accordance with the pseudo code algorithm described hereinbefore.

Referring to FIGS. 8a-8d in conjunction with FIGS. 2 and 3, wherein a two pixel width character or line is represented in a pixel grid. FIG. 8a is an illustration of a binary bitmap of a two pixel wide character. It can be seen that the pixels are either all black (filled with solid area density of maximum toner Dmax) or have no toner and have area toner density of zero. FIG. 8b illustrates assignment of eight bit values for the binary values of FIG. 8a after determination of the edge pixels according to a Laplacian kernel. FIG. 8c illustrates assignment of direction values for the pixels surrounding character pixels after application of the directional assignment algorithm of block 322 of FIG. 2 and LUT of FIG. 18d. FIG. 8d illustrates the assignment background pixel, edge pixel and of direction values for the pixel grid in accordance with the pseudo code algorithm described hereinbefore.

As described, in order to preserve fine lines (avoid loss of information), one and two pixel wide lines are each detected when "thinning". All pixels that comprise a one or two pixel wide line are categorized as edge pixels after the Laplacian operation. It is to be appreciated that many methods known in the art can be used to identify 1 and 2 pixel wide lines. As described herein, to distinguish 1 and 2 pixel wide lines from other edge pixels, the original image which has been converted to 8 bits is operated upon by a 3×3 direction look up table (DIR LUT). The resulting output contains information identifying the edge gradient of all edges. Using information from the original image, the output of this operation along with edge pixel data from the image created by the Laplacian operation is used to identify pixels which are part of a one pixel wide line from pixels which are part of a two pixel wide line. Since one pixel wide lines can be detected and distinguished from 2 pixel wide lines, each type of line can have a unique gray level assigned to it which in turn can be different from other edge pixels.

Note that if iterative thinning or thickening is applied, there may exist first layer edge pixel values, second layer pixel values, etc. The gray level range for interior and edge pixels is 0 (no exposure) to 255 (maximum exposure). When thinning, one and two pixel wide lines have a range from some minimum exposure (not 0) to the maximum exposure. This is so that these lines will appear on the print. However, the present invention does not preclude setting gray level on these in order to intentionally erase fine lines.

Figure 9:
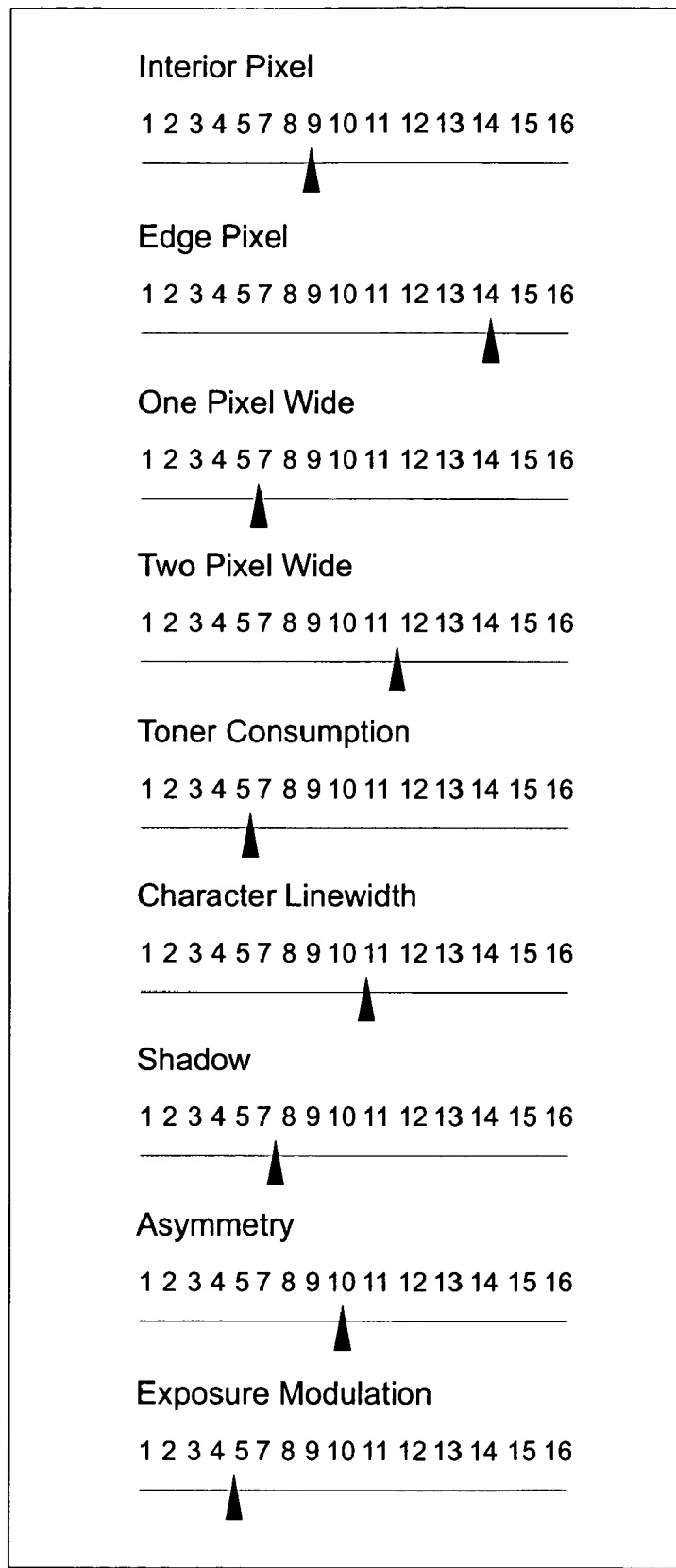
FIG. 9 is a schematic representation of an exemplary adjustment interface for assigning new pixel values according to the present invention.

FIG. 9 illustrates an example of an interface for an operator to adjust the pixel density assignment values. Other inputs can be utilized. As discussed previously, an operator can adjust these parameters in different ways to achieve a desired print result. For exemplary purposes only, there is shown adjustments for the values of interior pixel, edge pixel, one pixel wide, two pixel wide, toner consumption, character linewidth, shadow, asymetry and exposure modulation (lightness/darkness). The adjustments can be made utilizing a user interface or mechanical switch connected to the printer, the particular kind and style of interface being variable. Providing a user with an interface allows that user to make many adjustments to the image so as to achieve a particular print output without having to rerip the image. As discussed herein, different printers provide different print characteristics. The user interface provides a means to adjust one printer to mimic or appear like another printer on the fly, so to speak. That is, adjustments can be made while the printer is operating so that print output may be analyzed quickly and iteratively with little inconvenience. Not all of the adjustments in FIG. 9 would be located in the same interface, and other adjustments not specifically shown therein are contemplated.

The present RENDER circuit may be used in any type of digital printing system, such as electrostatographic, electrophotographic, inkjet, laser jet, etc. Of any size or capacity in which pixel exposure adjustment value is selected prior to printing. The printer processes a bit map of the image to be printed and identifies edge pixels first and then identifies other types of pixels in that image. The exposure level for these pixels is then set by the printer according to new pixel exposure adjustment values according to density adjustments performed by the printer. Many printed image and object characteristics, parameters and utilities may be affected by this method. For instance, a pattern may be provided to interior pixels. This would be applied in the mapping section where the interior pixel value is assigned. A benefit to the present algorithm is that changes may take effect immediately because process control controls to the same density.

When combining output from different printers to create one document, it is sometimes desirable to have the look and feel of the printers to be as similar as possible. Also, bitmaps of images ripped on one printer are sometimes printed on a printer with different characteristics than the original printer for which they were ripped. The present invention provides a method to obtain this result without reripping images and without adjusting other machine setup parameters (e.g. Electrostatographic process setpoints). Appearance aspects which may be adjusted include but are not limited to text, line widths and pictorial tone scale. Feel aspect include but are not limited to toner stacking (tactile feel of toner stack). Image adjustments made utilizing the RENDER circuit described herein take immediate effect on print output and therefore avoids any time delays normally associated with closed loop control system adjustment to electrostatographic process setpoints.

Sometimes users are willing to tradeoff image quality to attain higher toner yield per printed page. Another aspect of the RENDER circuit is to provide the user with a "knob" or adjustment to adjust toner consumption at various levels of image quality, as shown in FIG. 9. A user is provided the ability to lower certain pixel values, like interior and edge pixels, thereby lowering the amount of toner being deposited in the affected pixels and thereby lowering overall toner consumption. A user can adjust the printed image in this manner so as to minimize toner consumption while maintaining acceptable image quality without having to rerip the image.

To this end, it can be seen that the RENDER circuit accounts for all pixels of an image to be printed, and determines toner levels for each pixel. With this being the case, the printer may track or monitor total toner consumption of the printer accurately by adding or calculating the toner deposited for each line, character, and image processed and printed. By counting the number of edge (those having at least one adjacent pixel non toned) and interior (those having all adjacent pixels toned) and applying different conversion factors (toner usage per pixel to each), a prediction of toner usage can be achieved. Toner consumption by line, page, job or multiple jobs can be accomplished. This estimate has customer applications as well as potential uses in toner replenishment/toner concentration control in the printer itself. The conversion factors applied can also be dependent on the density targets used in printers that have variable density control allowing the customer to select the best cost/quality point for each job. As an example, 6% coverage documents made up of text and made up of 1 inch solid squares have been shown to consume between 0.0397 and 0.0294 grams of toner per sheet respectively. This difference of 33% occurs even though the total number of black pixels for the two documents differs by less than 0.5% analyzing these two images for edge and interior pixels indicates that edge pixels consume 1.3 times the toner that interior pixels do. Accounting for the edge and interior pixels separately clearly yields improved estimates for toner consumption than estimates using only pixel counts.

As mentioned hereinbefore, the process of electrostatography or electrography involves forming an electrostatic charge image on a dielectric surface, typically the surface of a photoconductive recording element that is being drawn or otherwise conveyed through a developing station or toning zone. The image is developed by bringing a two-component developer into contact with the electrostatic image and/or the dielectric surface upon which the image is disposed. The developer includes a mixture of pigmented resinous particles generally referred to as toner and magnetically-attractable particles generally referred to as carrier. The nonmagnetic toner particles impinge upon the carrier particles and thereby acquire a triboelectric charge that is opposite the charge of the electrostatic image. The developer and the electrostatic image are brought into contact with each other in the toning zone, wherein the toner particles are stripped from the carrier particles and attracted to the image by the relatively strong electrostatic force thereof. Thus, the toner particles are deposited on the image. The magnetic carrier particles are drawn to the toning shell by the rotating magnets therein. This magnetic force generally does not affect the nonmagnetic toner particles.

However, within the toning zone the toner particles are affected by forces other than the electrostatic force attracting the toner to the image and which may degrade image quality. These forces include, for example, repulsion of toner from the portion of the dielectric surface or photoconductive element that corresponds to the background area of the image, electrical attraction of the toner particles to the carrier particles, repulsion of toner particles from other toner particles, and electrical attraction to or repulsion from the toning shell depending on the polarity of the film voltage in the developer nip area. There are certain methods of compensating for and/or balancing the effect of these other forces on the nonmagnetic toner particles to prevent any significant adverse effect on image quality. However, the forces on toner particles having magnetic content are very different from the forces on nonmagnetic toner.

In addition to the electrical forces acting on nonmagnetic toner as described above, toner having magnetic content is subjected to magnetic forces, such as, for example, magnetic attraction of the toner particles to the carrier particles, to other toner particles, and to the rotating core magnet. All of these magnetic forces are generally in a direction away from the film or electrostatic image carrier. The only force acting to draw the toner onto the electrostatic image carried by the film or dielectric carrier is the electric force. Thus, the magnetic forces tend to counteract the electric attraction of toner particles to the image. The strength of the electric force relative to the magnetic forces becomes stronger as the distance between the image and the core magnet increases. Therefore, the toner tends to be deposited on the trailing edge of the film or dielectric carrier. The result is an image having solids with heavy toning on the trailing edge of the image, and cross track lines (i.e., lines perpendicular to the direction of travel of the dielectric support member or film) that are wider than the corresponding in track lines (i.e., lines that are parallel to the direction of travel of the dielectric support member or film).

This "fringe" field effect (the condition wherein fringe electromagnetic fields around the edges of lines on the photoconductor result in toner build up at edges of lines on the printed material) can be a problem for some printers. The RENDER circuit described herein provides a method to reduce the toner build up on the edges by adjusting the IPV, EPV, 1PV or 2PV parameters accordingly to reduce or counteract these effects. For example, FIGS. 5*a*-5*d* illustrate a character having different exposure values assigned to different layers which may be utilized to minimize the fringe field effect on image quality.

As described hereinbefore, Dmax control uses the signal from a transmission densitometer circuit reading a Dmax patch to adjust V0 and/or E0 electrophotographic parameters concurrently to maintain solid area density. In addition to Dmax, a shadow detail patch may be written using approximately 70-90% pixel pattern or at 70-90% of Dmax exposure in a flat field pattern at the selected edge and interior pixel exposure values determined by the RENDER circuit during tuning prior to the run. Based on the densitometer signal generated by this patch, the edge and interior pixel exposure values may be adjusted to maintain the desired shadow detail density (or large line character width) by adjusting or reassigning pixel values. In addition, a highlight detail patch may be written using approximately 5-20% of Dmax exposure black pixels in a flat field pattern using the selected edge, interior, and small feature pixel exposure values determined by the RENDER circuit during tuning prior to the run. Based on the densitometer signal generated by this patch, the small feature pixel values may be adjusted to maintain the desired highlight detail density (or fine line character linewidth) by reassigning one or more of EPV, 1PV and 2PV.

Figure 10:
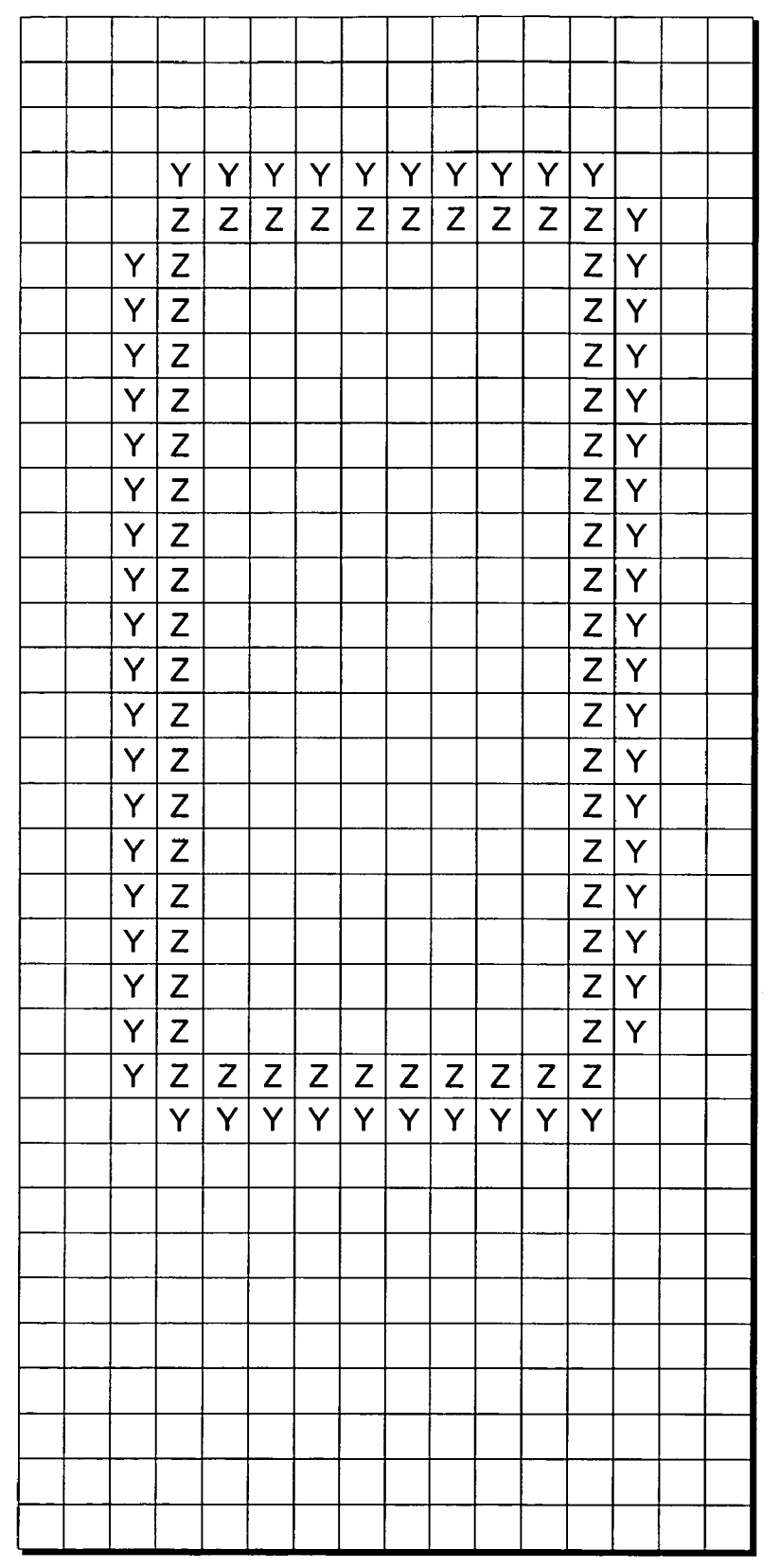

As described herein, it is possible using the RENDER circuit to apply reduced exposure at all edges of characters, but this may lead to too large a reduction in line width since the minimum adjustment is applied to two pixels. This is especially true of characters printed in a small font size. To achieve less linewidth reduction, half of character edges may be reduced (top and left edges only for example). This may lead, however, to an apparent shift of the center of the characters locations and this may be undesirable for a particular application (for instance with kerned fonts and small font size characters). To achieve linewidth reductions less than those achieved with all edge pixel exposure reductions, and avoid apparent center shifts of small font size characters caused by top/left or bottom/right edge exposure reductions, the RENDER circuit may apply an alternative algorithm and assign pixel values such that closed characters (those having enclosed spaces such as O, D, B, etc.) Have reduced exposure only for the interior or exterior edges of enclosed areas. For example, FIG. 10 illustrates a letter "O", (which is a closed character), having interior edges and exterior edges with different exposure values assigned to them. This helps to maintain the center location of character without achieving excessive linewidth reduction. Remaining straight portions of the characters may have only one edge exposure reduced. A similar algorithm may be applied to characters having partially enclosed spaces (such as V, C, M, N etc.) Whereby only the interior or exterior edge is exposure modified. Characters with multiple partially enclosed spaces (such as T, Y, W, M, etc.) Would require a larger set of rules to avoid modifying both edges of any strokes, but it should be possible to generate a consistent set of rules capable of avoiding such conflicts.

Desired edge exposure reductions may utilize a two dimensional operator of sufficient size to completely enclose the largest size character to which it will be applied. If an area is identified in the operator field of view as a separate object, it may then operate on the object in accordance with the rendering algorithm described herein to reduce apparent linewidth while minimizing the apparent center shifting of characters.

As the interior pixel (solid area density) exposures drop below certain levels, electrophotographic process nonuniformities become apparent in the solid area imaging. Assigning a pattern of different exposure values for interior pixels (multiple IPVs rather than using a single exposure for all interior pixels) reduces the visibility of EP process non-uniformity. The particular pattern used is analogous to a halftoning pattern for binary imaging, except the modulation is between different non-white exposure levels. The pattern of differing density pixels tends to obscure streaks and bands that become visible in flat fields of same level exposure pixels and minimizes the visibility of non-uniform density. The nonuniformities can be identified or measured in a number of ways, examples of which are visually inspecting the printed output or utilizing a density patch and measuring density thereof. The pattern can be of any size with any number of different exposure values such that it creates the desired average interior pixel density when printed to reduce print nonuniformities.

In this regard, the present invention is useful when printing magnetic toner or ink. Magnetic ink character recognition (MICR) technologies have been used for many years for the automated reading and sorting of checks and negotiable payment instruments, as well as for other documents in need of high speed reading and sorting. As well known in the art, MICR documents are printed with characters in a special font (e.g., the e13-b MICR font in the united states, and the cmc-7 MICR standard in some other countries). Typically, MICR characters are used to indicate the payor financial institution, payor account number, and instrument number, on the payment instrument. In addition to the special font, MICR characters are printed with special inks or toners that include magnetizable substances, such as iron oxide, that are magnetized for facilitating an automatic reading process by a reading instrument which is sensitive to the magnetic fields surrounding the printed MICR characters. The magnetized MICR characters present a magnetic signal of adequate readable strength to the reading and sorting equipment, to facilitate automated routing and clearing functions in the presentation and payment of these instruments.

The relatively heavy loading of iron oxide in conventional MICR toner for electrographic MICR printing has been observed to adversely affect the image quality of the printed characters, however. It is difficult to achieve and maintain an adequate dispersion of the heavy iron oxide particles in the toner resin. In addition, the toning and fusing efficiencies of MICR toners are poorer than normal (i.e., non-MICR) toners, because of the magnetic loadings present in the MICR toner. Accordingly, the image quality provided by MICR toner may be poorer than those formed by normal toner, unless the printing machine makes adjustments to compensate. The present RENDER circuit provides a way to adjust MICR toner density in parts of characters so as to minimize the printing nonuniformities resultant therefrom. By varying pixel toner density values as a function of pixel character location as illustrated in the exemplary drawings herein, the concentration of magnetic toner particles may be adjusted to improve the readability of the printed characters by reading instrumentation.

Figure 11:
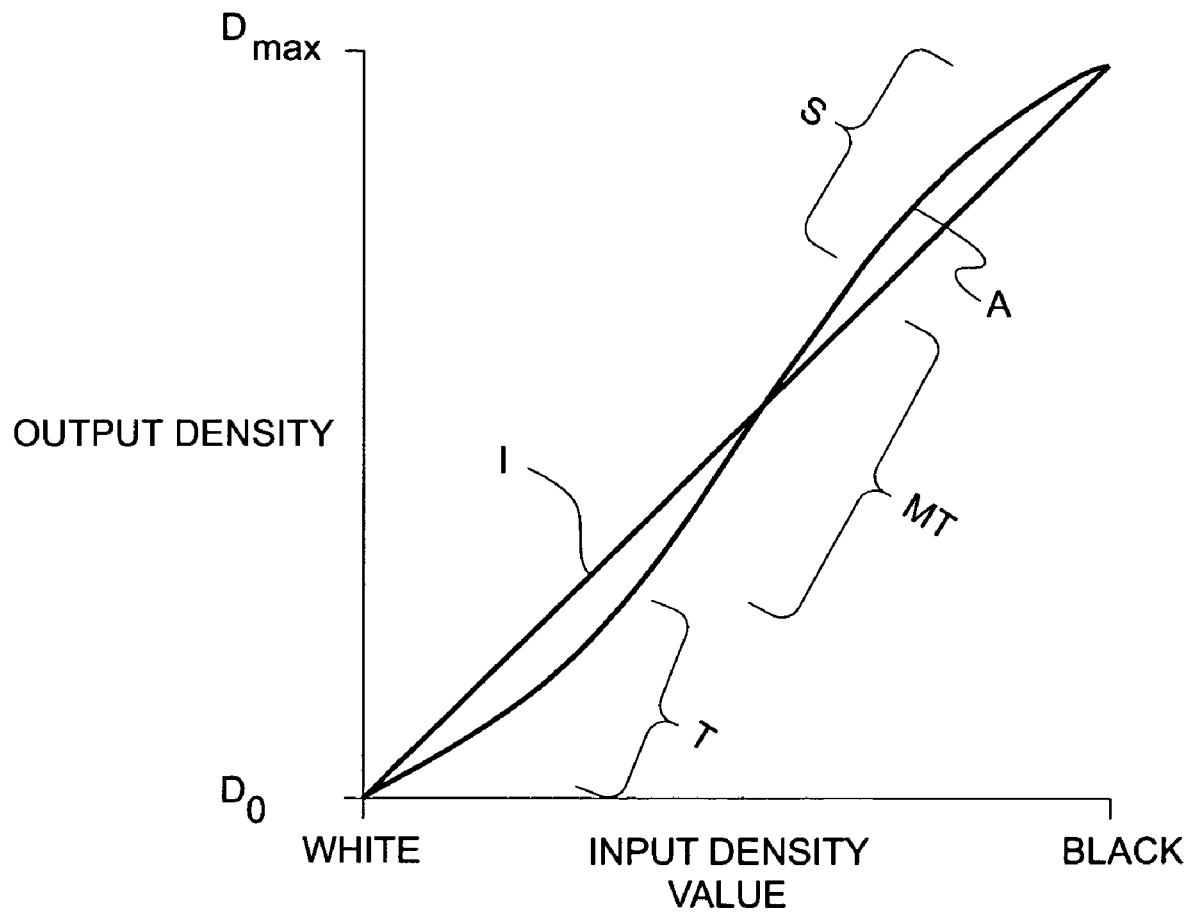
FIG. 11 is an example of a tone reproduction curve for an electrographic printer in accordance with the present invention.

FIG. 11 illustrates an example of a typical tone reproduction curve, also referred to in the art as a "gamma" curve, illustrating the typical performance of conventional printers in reproducing tone density, in this example for gray scale printing. In this plot, the horizontal axis corresponds to input intensity between white (no intensity) and black (full intensity); the vertical axis corresponds to the corresponding printer output density, on the hard copy medium, between $d_o$ (no density) and Dmax (full density). Ideally, the transfer function from input intensity to output density would be a 45° line, shown as ideal plot I in FIG. 11, along which the output density exactly matches the input intensity.

Printer performance follows a non-linear "S-shaped" tone reproduction curve, for example as shown by actual plot a in FIG. 11, often referred to as the "gamma" curve. Along this tone reproduction curve, output density is generally less than that specified by low input intensity values (i.e., below the ideal I); this portion of the tone reproduction curve is referred to as the "toe", shown by region t in FIG. 11. The output densities in the "toe" region are also referred to as "highlight" densities. At the other extreme, for high input intensity values, output density is generally higher than that specified by the input (i.e., above the ideal I). These output densities in the "shoulder" region of the tone reproduction curve, for example in region S of plot a in FIG. 11, are also referred to as "shadow" densities. For both the highlight and shadow densities, the inaccuracy in tone reproduction is generally manifest by inaccuracies in the printed contrast; the underdensity in highlight regions shows up as washed out regions of the image, while the overdensity in shadow regions shows up by the absence of bright features (loss of detail in dark regions). In the "midtone" region of the tone reproduction curve, shown by region MT of plot a in FIG. 11, the error between output density and input intensity is relatively small, so that midtones produced by the printer closely match the input signal.

In many cases, the raster image processor (rip) described above, by way of which a page description is converted into a bit map output for printing by a specific printer of the electrographic or other type, applies gamma correction in this processing. This gamma correction compensates for the non-ideal density output of the printer, in effect applying a transfer function that is the opposite of the tone reproduction curve for the printer (e.g., plot a of FIG. 11). This correction will generally be implemented by increasing the density output for lower input intensity values, and decreasing the density output for higher input intensity values. To at least a first approximation, the correction amounts to the selection of a gamma value, which is a compensating factor corresponding to the degree of curvature of the actual tone reproduction curve a from the ideal I. As noted above, the actual correction may be carried out by selection of the appropriate halftone screens using higher density halftone screens for highlight densities, and lower density halftone screens for shoulder densities.

According to conventional approaches, the selection of the appropriate halftone screens for a given printer or printer type requires a trial and error process. The correct Dmax output density level must first be correlated to full density input. Once Dmax is set, then a representative image is processed using a trial set of corrections for highlight and shadow densities; after analysis of the output image, the corrections may be adjusted and the image processed again. Upon convergence to the desired output, additional images may be adjusted using the corrections (e.g., the selected set of halftone screens) determined in the trial and error process, and printing can commence. To the extent that the iterative setting of shoulder and toe corrections must be performed for a given printer, or on specific images, this procedure is time consuming and costly.

Because of printer specificity in the RIP process, RIP output for one printer or printer type cannot be forwarded to a different electrographic printer without risking that the printed image will have incorrect gamma correction for the images. In other words, the gamma correction in the RIP output based on the printer for which the original RIP was performed will likely not correspond to the tone reproduction curve of a different printer.

As discussed above, U.S. Pat. No. 6,121,986 provides a solid area density control system, in which the optical density of maximum density patches, and of less than maximum density patches, is controlled in response to the measured performance of the electrographic printer. This solid area density control adjusts the output density Dmax during setup and operation of the printer, and also can control the output density at different less-than-maximum levels. However, this conventional solid area density control only controls the solid area output density value Dmax, and cannot separately control highlight and shadow densities. In other words, an increase in solid area output density Dmax compensates for the underdensity of highlights, but overcompensates for shadows. Conversely, a decrease in Dmax compensates for the overdensity of shadows, but undercompensates for highlights. While solid area control approaches stabilize the optical density of the exposed areas, they don't necessarily introduce variations into character linewidths of text (and analogously into the linewidths of small isolated image features). Linewidth variations are due in part to fringe field effects. As known in the art, the amount of toner applied to a pixel on the photoconductor of an electrographic printer depends upon the difference between the exposure voltage (as applied by the led or laser to the photoconductor) and the bias voltage at the toning station; changes in either of these voltages will change the amount of toner received by the pixel. Fringe effects occur because the electric field at the edge of an exposed patch (i.e., those edges of exposed pixels that are adjacent to unexposed pixels) is much greater than the field at the center of the exposed region. It has been observed that the difference in field magnitude between the edge and the center may be as high as 3× to 5×. As a result, toner tends to pile up at the edge of an exposed patch of pixels, and at the edge of single exposed pixels surrounded by unexposed pixels. In the case of single pixels, this piling effect can result in single pixel sizes of on the order of 90µ in 600 dpi printers that have a theoretical pixel pitch of 42µ. Again, these fringe effects affect both gray scale images and also full-black text and make it difficult to adjust image quality to the extent necessary to compensate for differences in characteristics between an electrographic printer for which the image was originally ripped, and a different electrographic printer upon which the image is to be printed. These fringe effects are reduced utilizing the RENDER circuit of the present invention by reassigning edge pixels to have lower exposure values (EPV) at the edge of an exposed patch of pixels, and at the edge of single exposed pixels surrounded by unexposed pixels.

Figure 12:
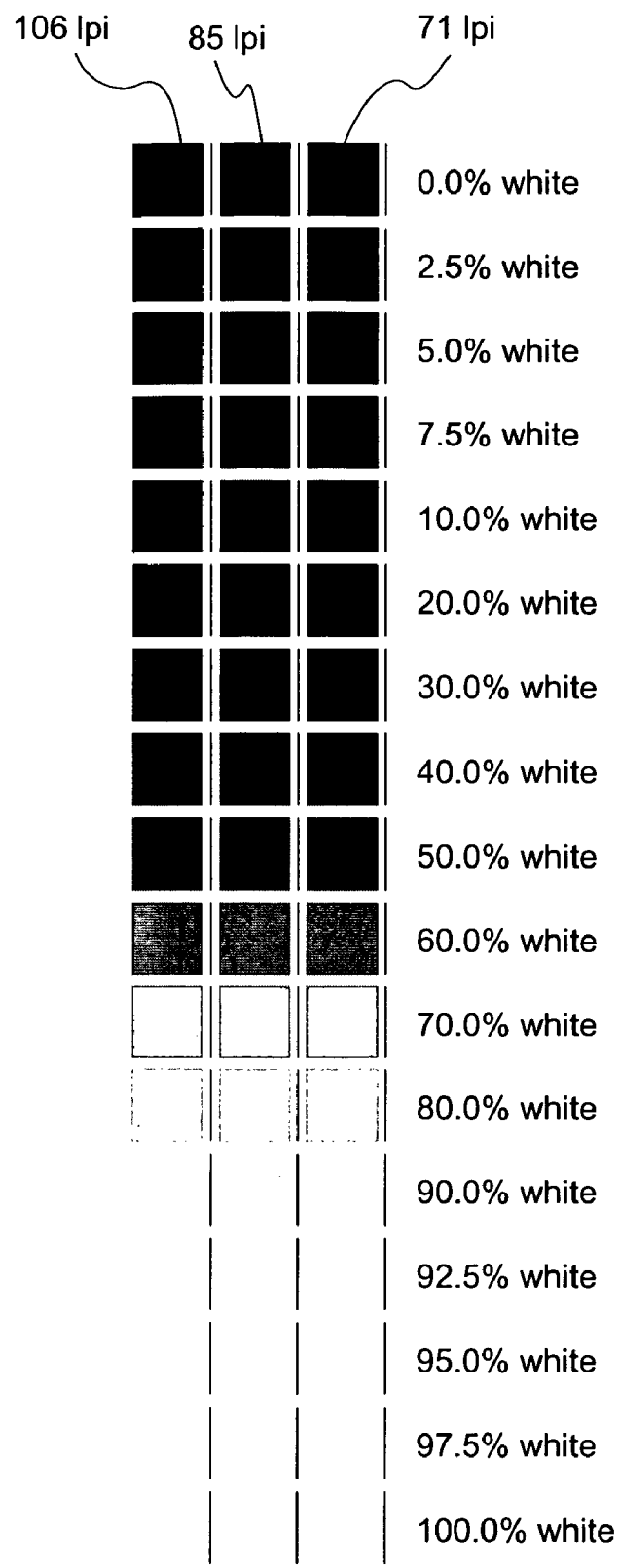
FIG. 12 is a copy of a series of printed halftone steps for three different screen frequencies.
Figure 13:
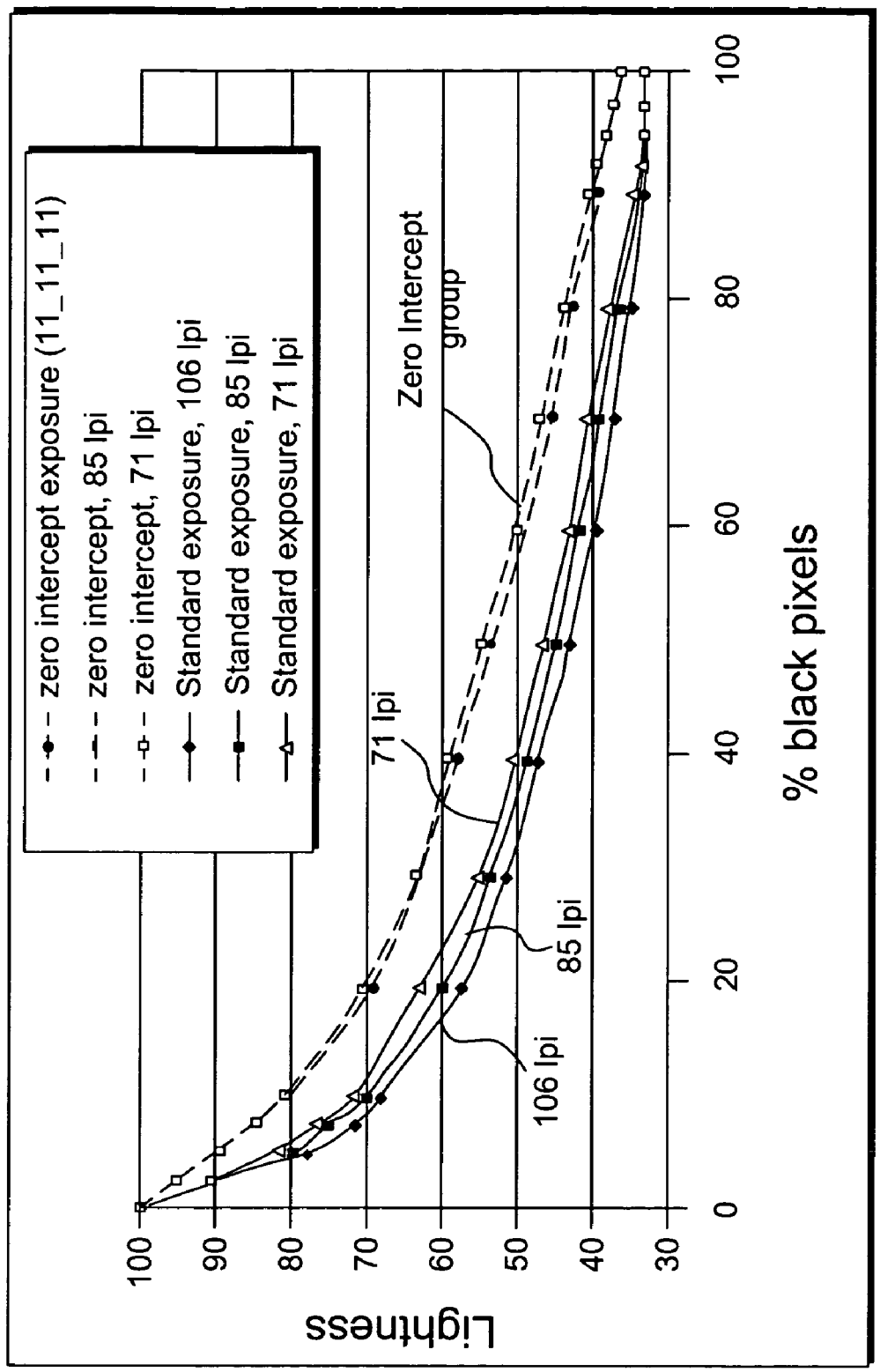
FIG. 13 is a graph illustrating percent lightness vs. percent black pixels for each step for each screen frequency shown in FIG. 14.
Figure 14:
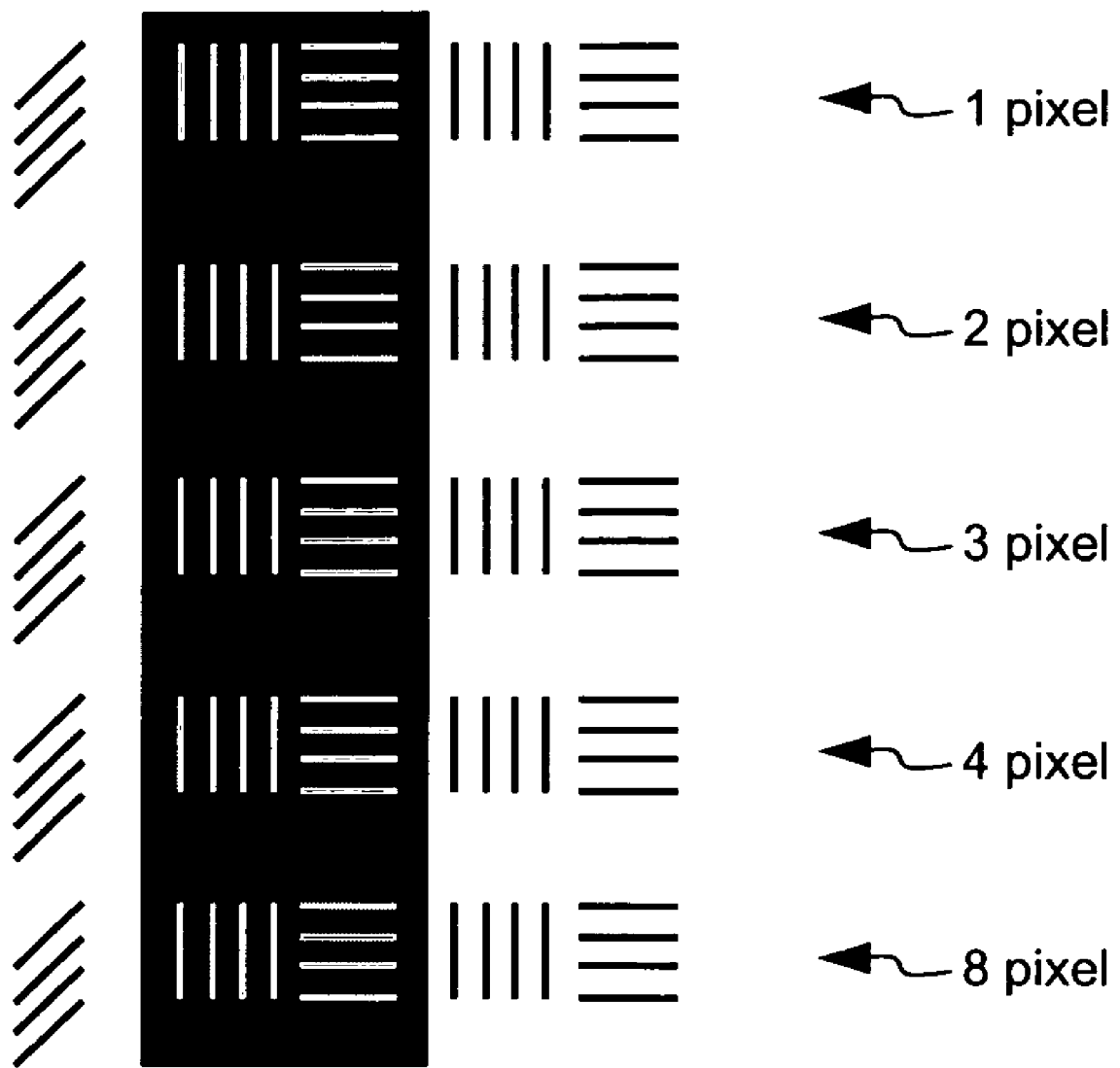
FIG. 14 is a copy of a series of printed lines that are 1, 2, 3, 4, and 8 pixels wide.
Figure 15:
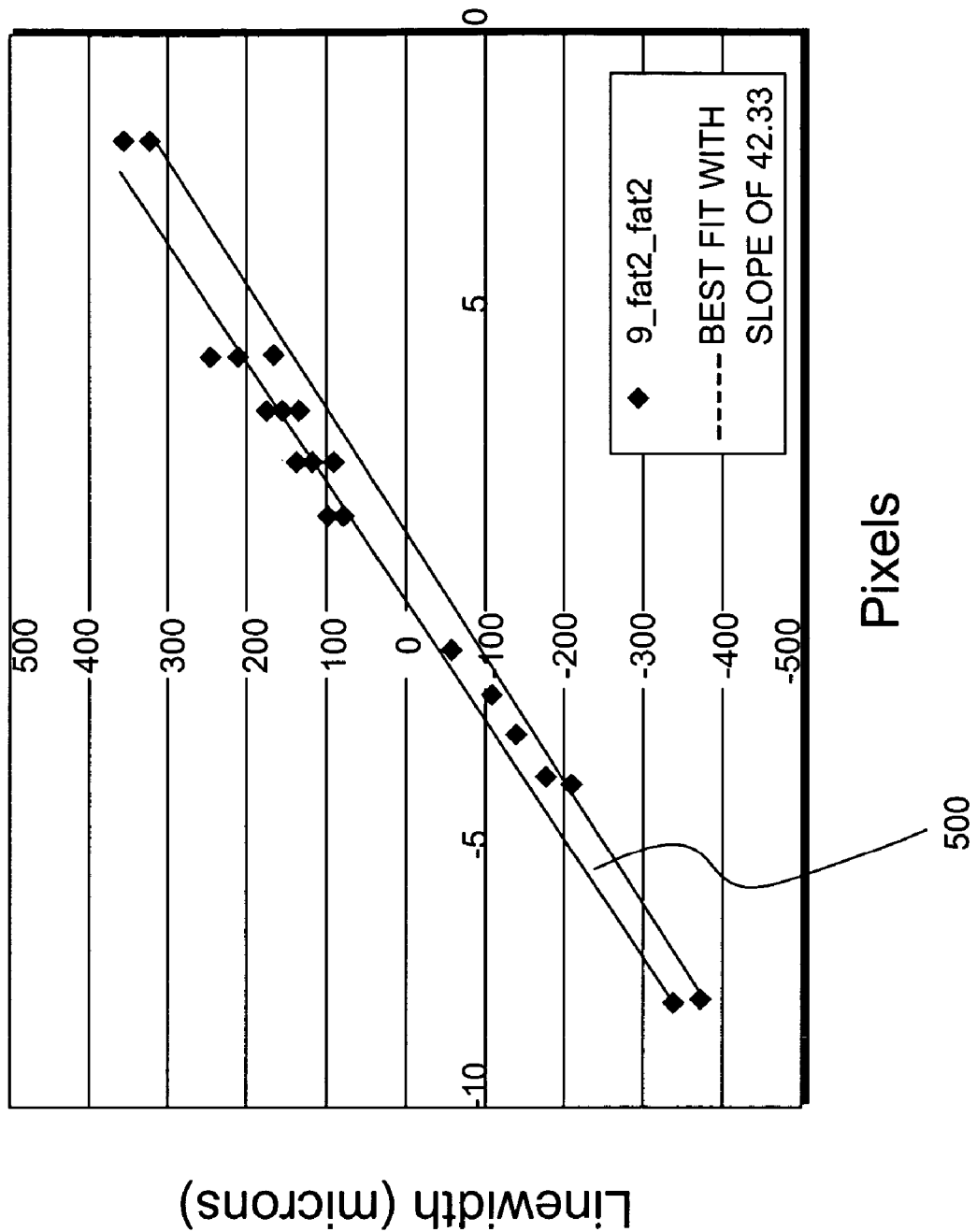
FIG. 15 is a graph illustrating linewidth vs. the number of pixels counted across the line for an exemplary series of lines of FIG. 14.
Figure 16:
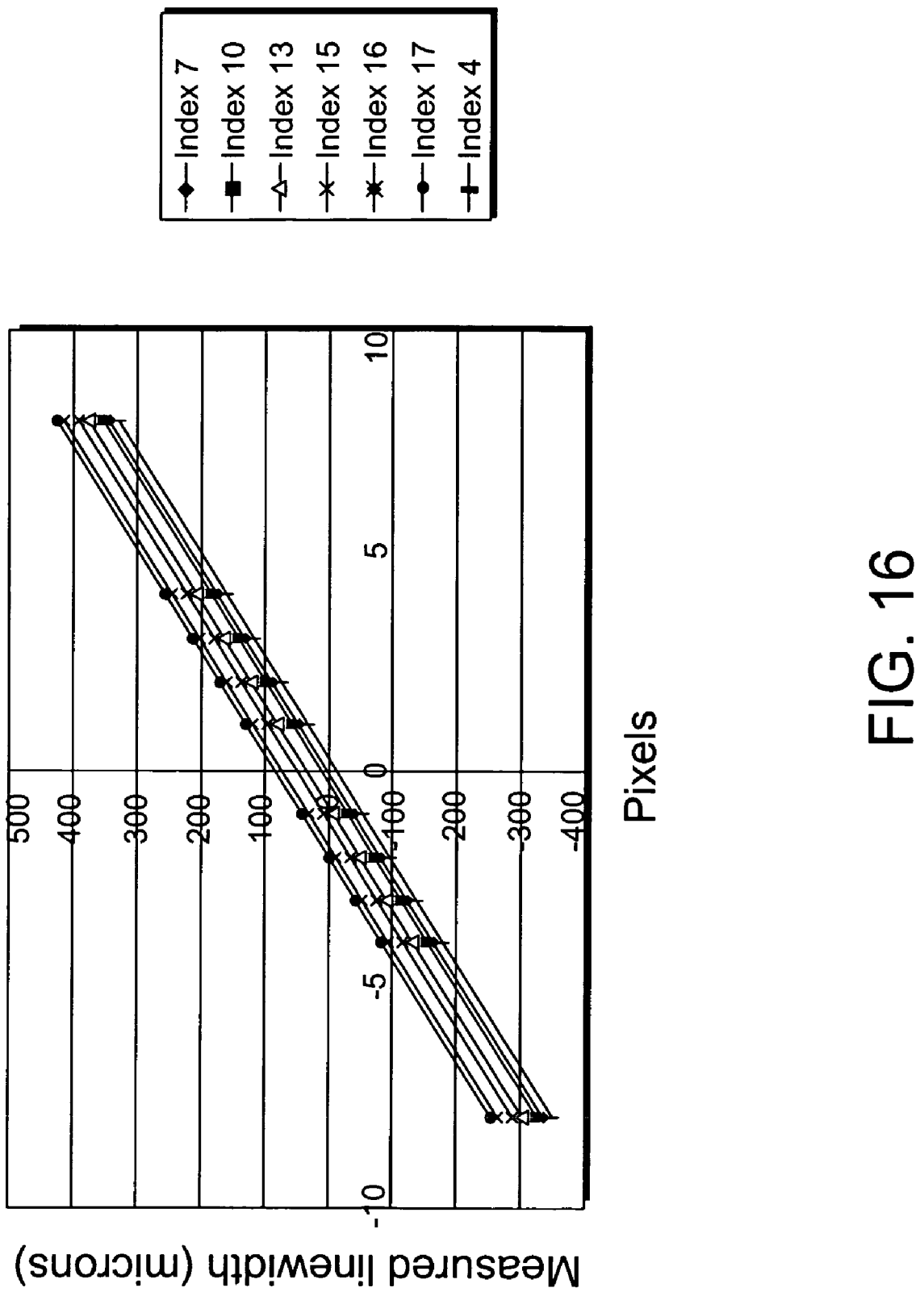
FIG. 16 is a graph illustrating best fit lines extracted for linewidth vs. the number of pixels derived by selecting a fixed IPV and varying EPV, 2PV and 1PV for eight different cases.

Many printers cannot produce a continuous spectrum of tone levels within an image. Instead, modulated patterns are used to simulate different tone levels. One common form of modulation is the use of halftones. For instance, many typical black and white printers use halftones to produce a variety of gray levels, such as 30% white or 60% white. The use of halftones involves dividing the rasterized image into halftone cells, each of which contains a fixed number of pixels. A continuous tone spectrum thus may be approximated by turning on a certain percentage of the pixels in each halftone cell. Theoretically, a 50% gray level may be achieved by turning on 50% of the pixels in a halftone cell on a black and white printer. Digitized halftone images processed at different effective screen frequencies (the number of lines per inch or lpi) often have different contrast (appearances) because of differing dot gains depending on the ratio of edge and interior pixels as the area coverage changes. FIG. 12 illustrates seventeen halftone steps (the percentage of white in each step) for three different screen frequencies, 106 lpi, 85 lpi and 71 lpi. The relationship of percent lightness to percent black pixels for each step for each screen frequency is shown in FIG. 13. It can be seen that the three curves at standard exposure are different, thereby illustrating different halftone images for different screen frequencies. FIG. 14 illustrates a series of lines that are 1, 2, 3, 4, and 8 pixels wide, respectively. FIG. 15 illustrates a graph of linewidth vs. the number of pixels counted across the line, where white spaces are assigned negative numbers for a particular set of lines with the same linewidth (for example 8 pixel wide lines). A best fit line 500 can be drawn through the data points collected. FIG. 16 illustrates a series of best fit lines extracted for linewidth vs. the number of pixels derived by selecting a fixed IPV and varying EPV, 2PV and 1PV for eight different cases. It can be seen that there are eight different best fit lines. It can also be seen that there is one particular best fit line that passes through the zero intercept. The EPV, 2PV and 1PV values for the zero intercept line was noted and a series of lines similar to those shown in FIG. 14 were printed at screen frequencies of 106 lpi, 85 lpi and 71 lpi. The relationship of percent lightness to percent black pixels for the three screen frequencies were plotted and are shown in FIG. 13, wherein the resulting curves identified as the zero intercept group curves. It can be seen that using the EPV, 2PV and 1PV values for the zero intercept line results in digitized halftone images that are the same for differing screen frequencies. By using EPV, 2PV and 1PV exposures that are different from IPV exposure, it is possible to achieve linear behavior between character linewidth and the number of pixels printed that has an intercept of zero. Because the IPV exposure hasn't changed, it is possible to retain good solid area fill by overlapping interior pixels. Because the relationship between pixel width and measured width has a zero intercept, image density for halftone patterns is not dependent on the ratio of edge and interior pixels, which means that is it also independent of screen frequency. Using a user interface, the user is therefore able to adjust the solid area maximum density (IPV) and then select edge pixel exposures (EPV, 2PV, 1PV) to achieve a zero intercept of the character linewidth vs. number of pixels curve to minimize screen frequency sensitivity. To this end, sensitivity to screens having different dot shapes (e.g. round, elliptical, diamond, etc.) May be minimized also.

Referring now to FIG. 18a, a 3×3 pixel array is illustrated. In the array, the center pixel is the PIQ. There are eight pixels surrounding the PIQ. These pixels have been assigned designations b0 through b7. An eight bit binary number can be created by associating a zero with an unmarked pixel and a 1 with a marked pixel as shown in FIG. 18b. For instance, FIG. 18c shows an exemplary pixel pattern adjacent to the PIQ. Assuming a marked pixel has a value of 1 and a blank pixel has a value of zero, the pattern in FIG. 18c (two marked pixels at bit positions B0 and B3) would correlate to a binary number of 00001001 (9 in decimal) according to the pixel designations defined in FIGS. 18a and 18b.

From FIG. 18b it can be derived that there are 256 different binary numbers associated with the eight binary bits (e.g. 00000001, 00000010, 00000011, 00000100, etc.) Representing the eight pixels surrounding the PIQ. A look up table (LUT) for the 256 entries may be created.

FIG. 18d provides a 256 entry LUT, wherein each entry represents a directional assignment (0, SE, S, SW, E, W, NE, N, NW) for the pixels in the configuration defined by the eight bit binary number. For example, in FIG. 18d, the entry in the first column of the first row represents the binary number 00000000. The entry to the right of 00000000 represents pixel configuration 00000001 wherein only one pixel (labeled B0 in FIG. 18a) is marked. That pixel would be given the directional assignment se. The entry to the right of that is 00000010 (wherein only the pixel labeled B1 in FIG. 18a) would be marked in accordance with the directional assignment s. The table entry directly below the 00000000 entry would be represented by the binary number 00010000 (16 in decimal), and wherein the PIQ would be given a directional assignment of W. The table entries shown in FIG. 18d for each of the 256 possible configurations therefore represent one of nine directional assignments for each pixel in that particular configuration.

Figure 19A:
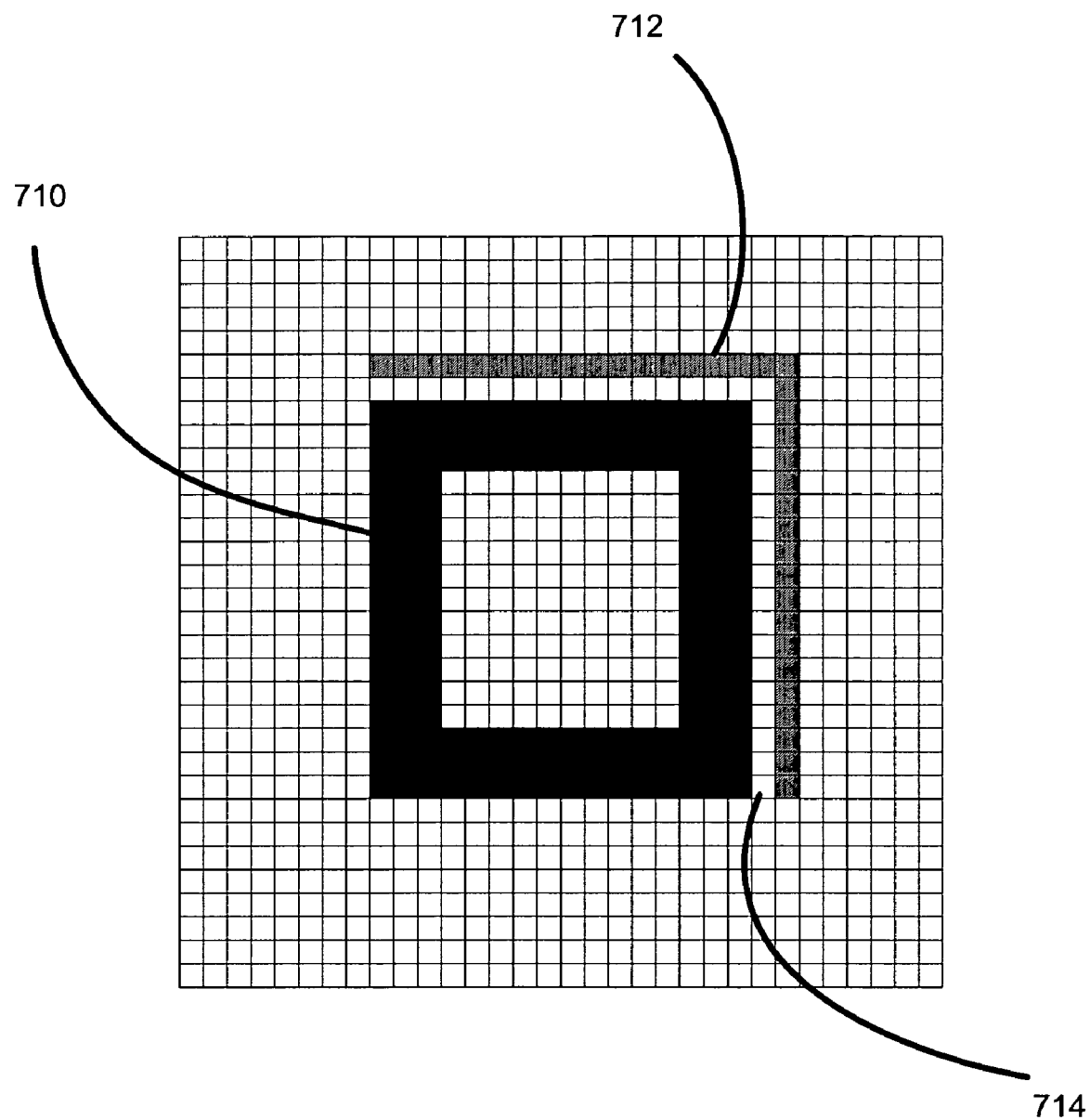

FIG. 19a is an illustration of a binary bitmap of a character in a pixel grid having two portions 710, 712, with differing pixel toner densities or other values. Portion 712 could, for example, be intended to be provide a shadow effect to portion 710. If portions 710 and 712 were intended to be contiguous, then FIG. 19a illustrates a case where the portions are misaligned (a case that is highly probable) wherein a one pixel wide blank line 714 lies between them. The misalignment may be a result of any number of registration problems originating from mechanical, electrical, or software discrepancies. Either the outer edge of portion 710, or the shadow portion 712 could be identified post RIP utilizing the directional and one pixel wide line recognition capabilities of the render algorithm described herein. For example, the pixels creating structure 712 would be identified as either N, NE, or E pixels.

FIG. 19b illustrates the one pixel wide outer edge 716 of portion 710 that is nearest portion 712 identified using the edge and directional capabilities of the present render algorithm. For example, the pixels of edge 716 would be identified as either N, NE, or E pixels.

Figure 19C:
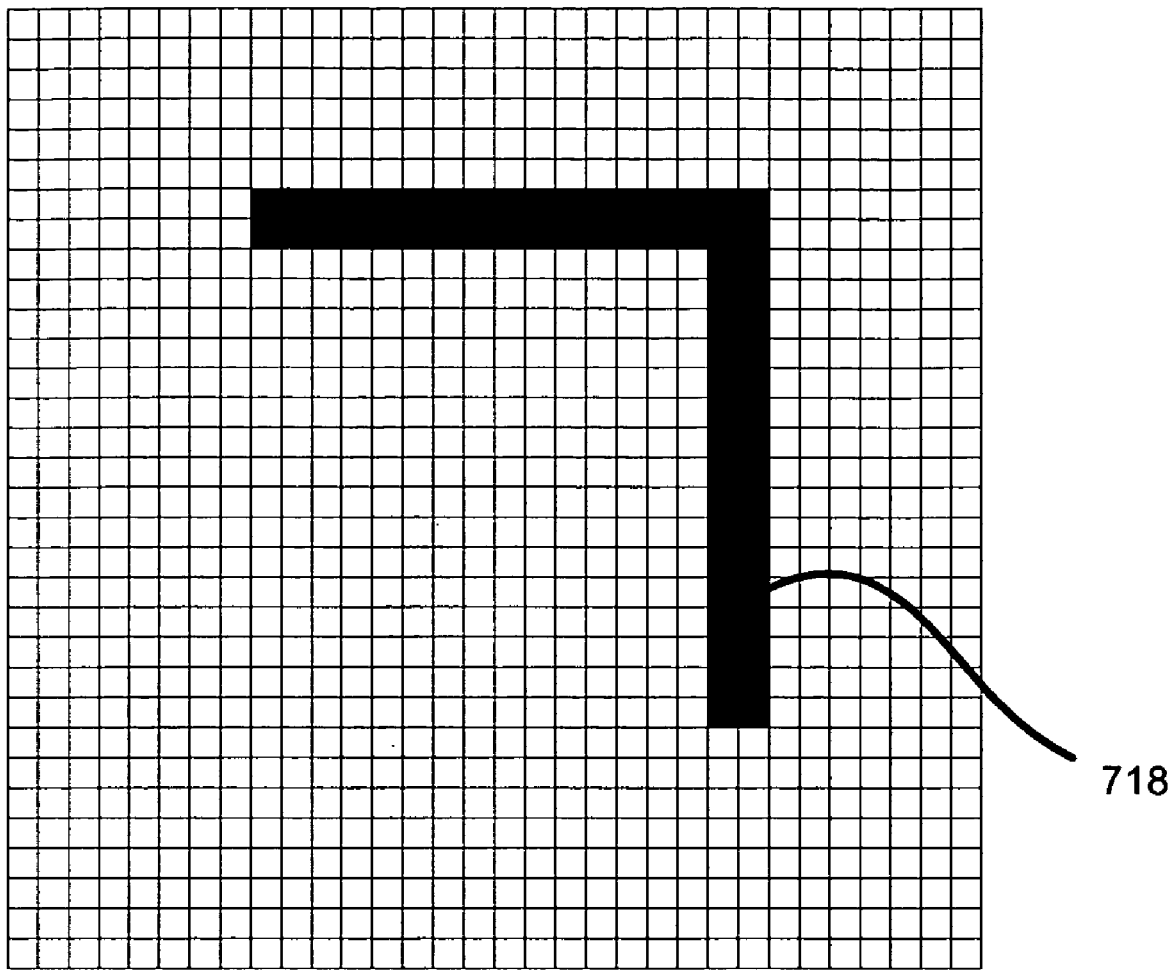

Referring to FIG. 19c, once identified, the edge could be thickened into a two pixel wide structure 716 utilizing the present algorithm.

Figure 19D:
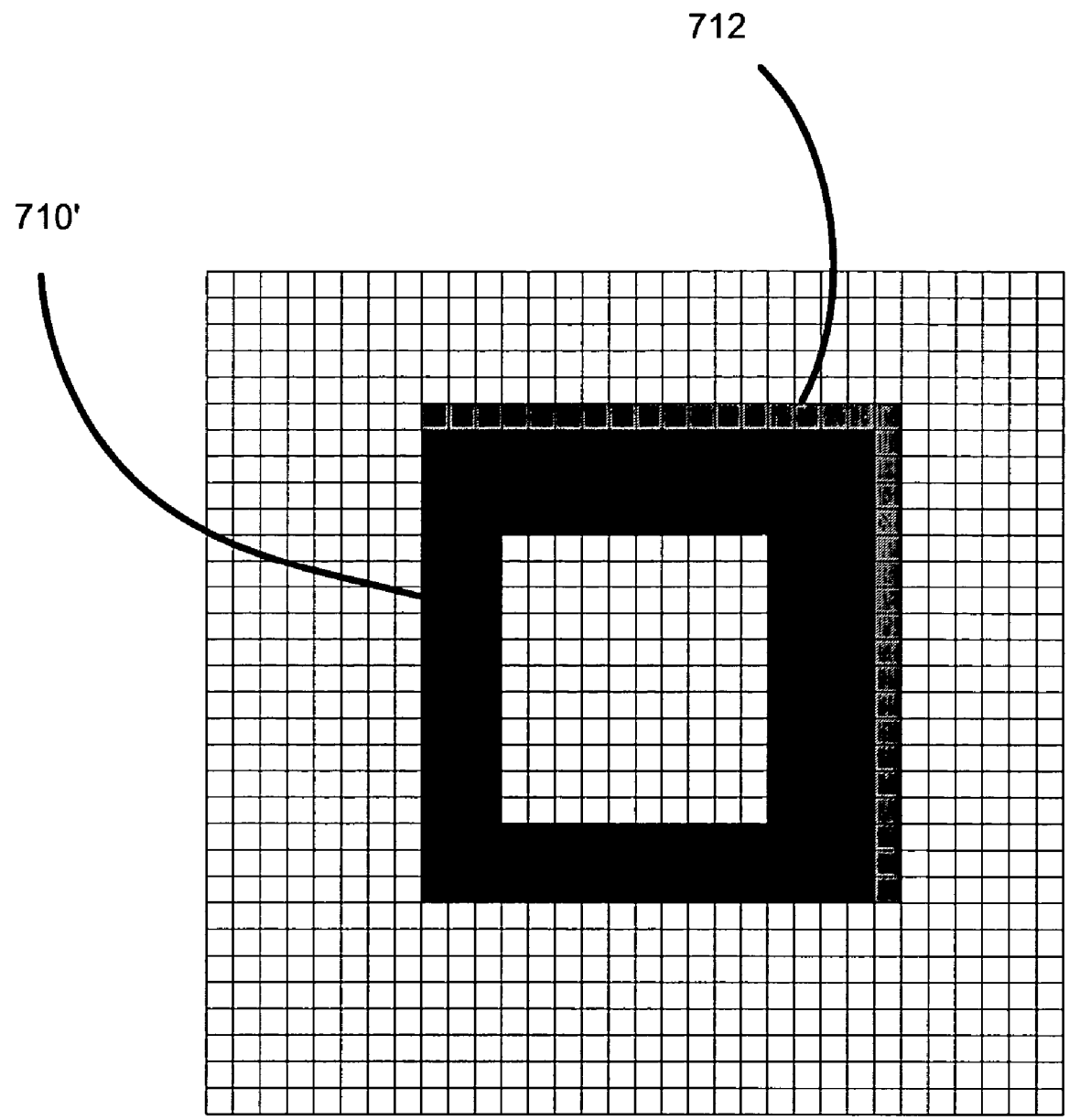
Figure 19E:
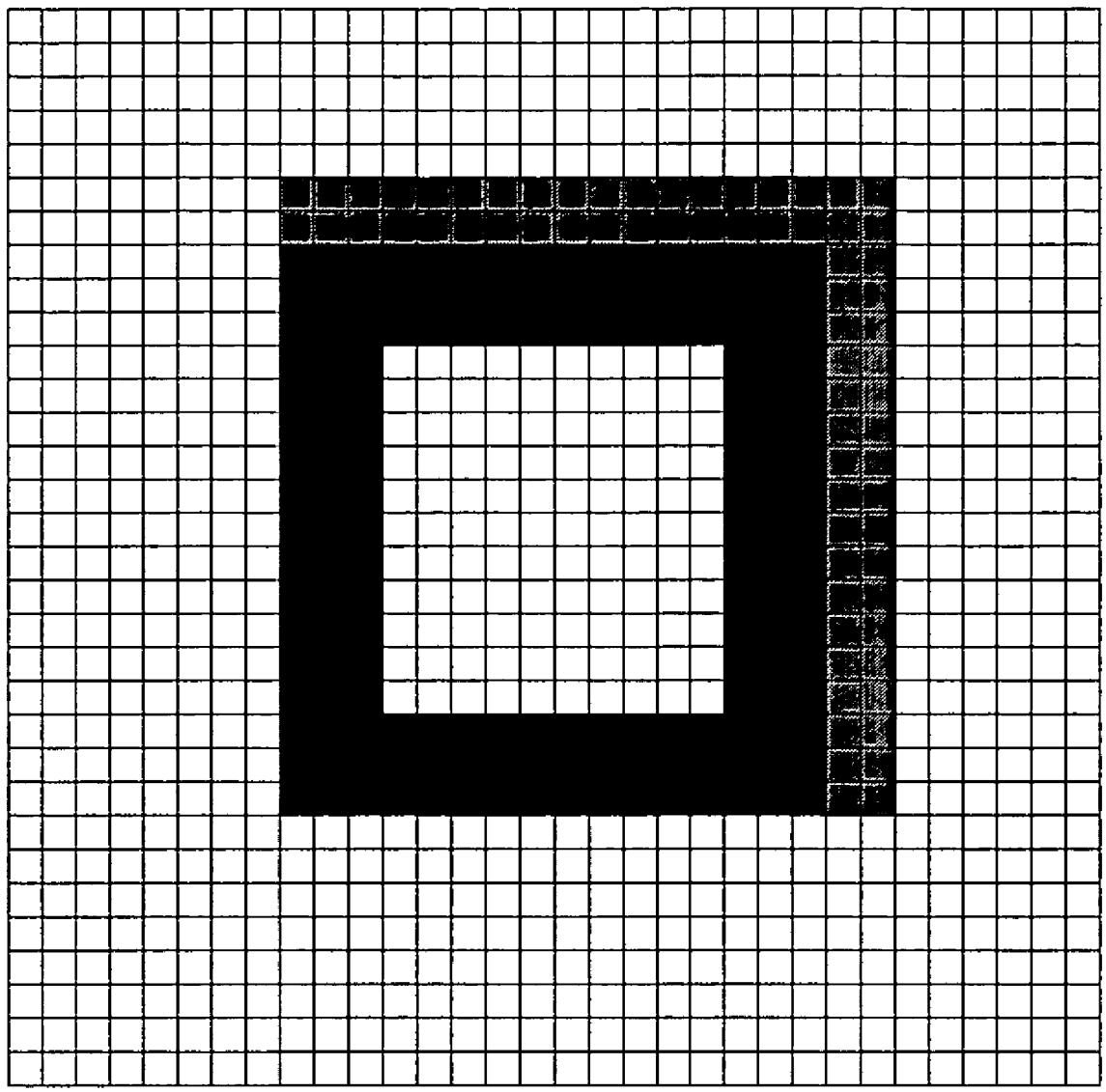

Referring to FIG. 19d illustrates a new portion 710' and portion 712 printed together. It can be seen that the blank one pixel wide structure 714 has been "filled" in so that portions 710' and 712 are contiguous with one another. In this manner, printer alignment problems of one or multiple pixel wide misalignments may be corrected in this fashion. It is also to be noted that shadow portion 712 also could have been thickened to correct for the misalignment issue. For multiple pixel wide alignment problems, both structures or portions can be thickened to "grow" closer to one another.

Figure 20A:
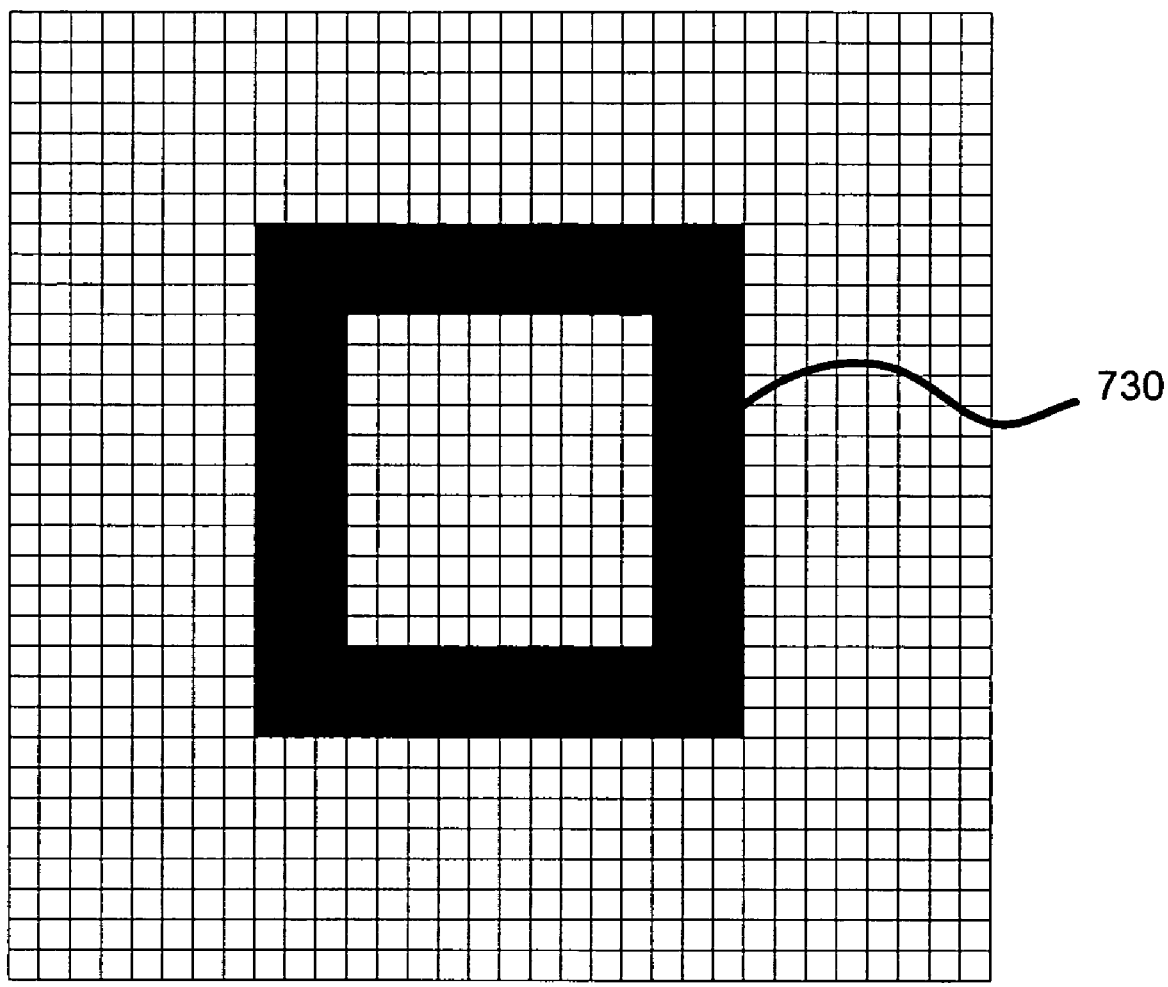
FIGS. 20a-20c are representations of a pixel grid having a toned images provided thereon in accordance with the present invention.

FIG. 20a is an illustration of a binary bitmap of a character 730 in a pixel grid.

Figure 20B:
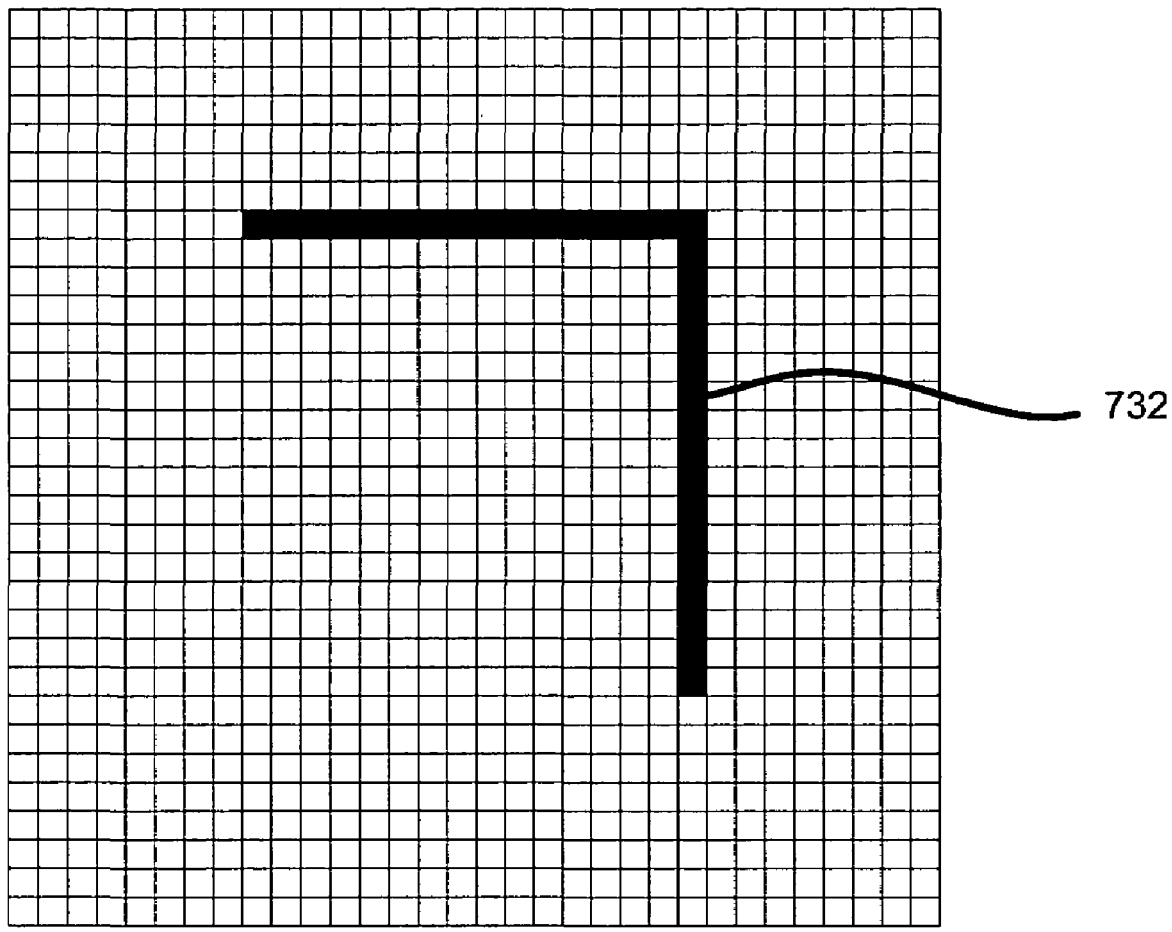

FIG. 20b illustrates the one pixel wide outer edge 732 of character 730 identified using the edge and directional capabilities of the present render algorithm. For example, the pixels of edge 732 would be identified as either N, NE, or E pixels.

Figure 20C:
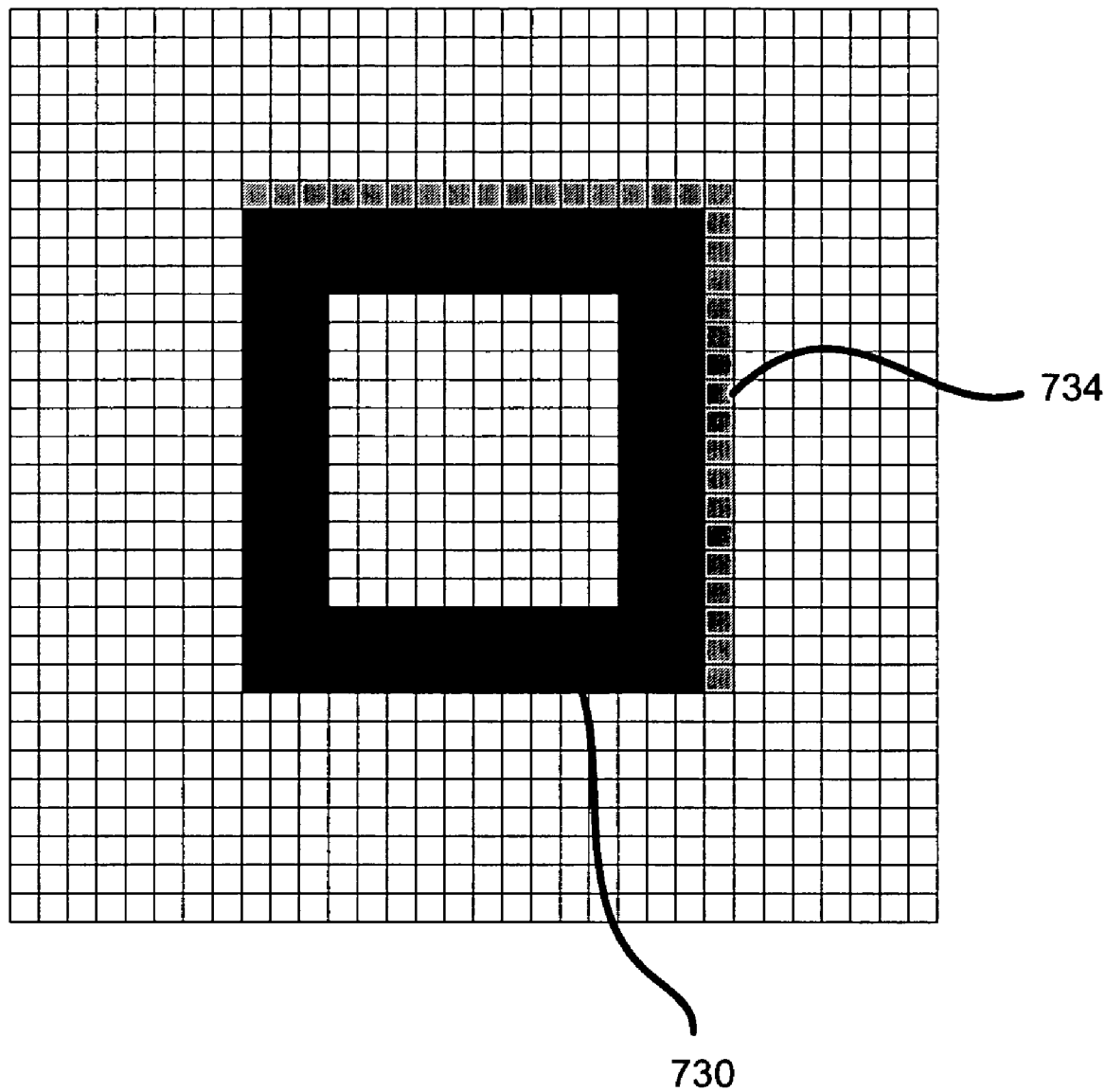

FIG. 20c illustrates how a one pixel wide structure 734 may be created adjacent or contiguous with structure 730. Structure 734 may have a different density or value than structure 730. In this manner, a shadow or other effect can be applied to any of a number of structure in an existing image post RIP.

As discussed earlier, a continuous tone spectrum may be approximated by turning on a certain percentage of the pixels in each halftone cell. The algorithm described hereinbefore provides the ability to independently control the line width/dot gain and solid area density of a binary ripped image in a printer which uses a multibit writer. Pixels defined by the ripping process are classified as background pixel, edge pixel, interior pixel, part of a 1 pixel wide line pixel, or part of a 2 pixel wide line pixel. Each pixel classification can be assigned a multibit value. By appropriate selection of values the dot gain/line width of the image can be modified as well as the solid area density. It has been demonstrated that line width and solid area density settings can be selected so that the line width can be adjusted independently of solid area density. As seen in FIG. 9, a GUI may be provided to a user in which the settings can be independent of each other. One of the sliders can be labeled "linewidth/dot gain" and another can be labeled "solid area density". At a given solid area density, the line width slider can be changed to obtain varying line widths without impacting the solid area density of text. Conversely, at a given line width setting, the solid area density slider can be changed to obtain different solid area densities while maintaining the same line width. However, changing linewidth/dot gain affects text linewidth as well as halftones and text/line art.

Therefore, if a ripped image contains both halftones areas and text/line art, it is possible that the desired linewidth/dot gain setting does not achieve the desired results for both halftones and text/line art. As an example, one set of linewidth/dot gain and solid area density settings yields the desired result for the halftone image on a page but is not satisfactory for the text/line art. A different set of settings may be required to attain the desired results for the text/line art.

The post RIP RENDER algorithm described hereinbefore provides a way to change text/line art. But these changes impact halftones as well because the algorithm operates globally (on all pixels in the image). These changes to halftones, however, might not be desired by the customer. The present invention provides a means to change text/line art without changing halftones, or changing text/line art and halftones independently.

Figure 21:
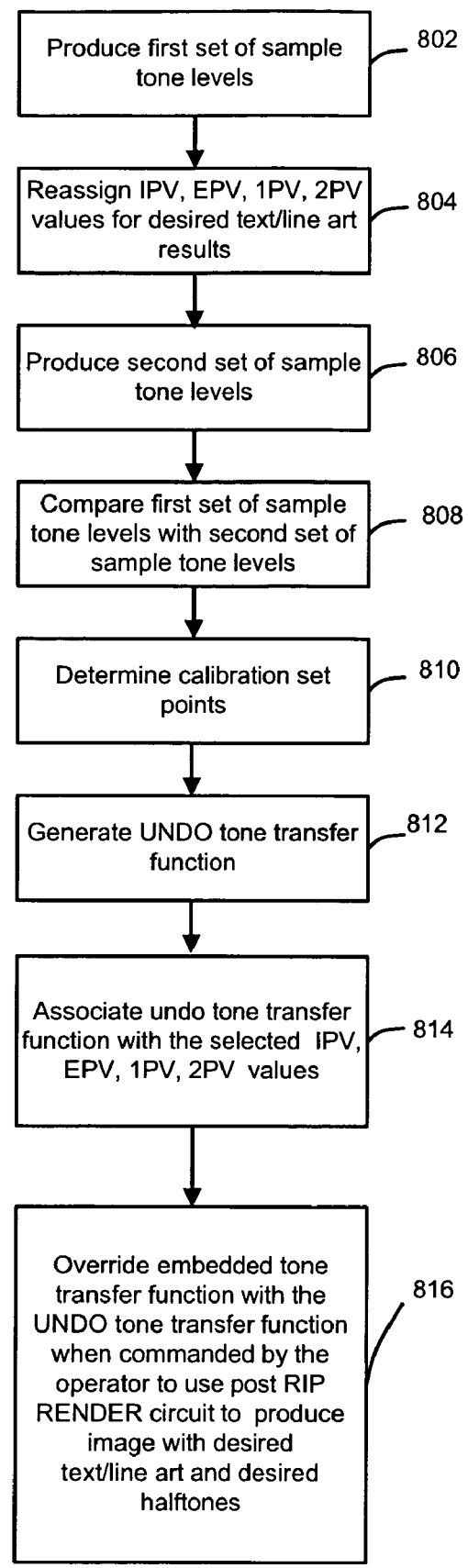
FIG. 21 shows a flow diagram depicting a method of matching the outputs of two marking devices according to one presently preferred embodiment of the invention.

Referring now FIG. 21, a method of changing text/line art and halftones independently involves a first step 802 to produce a set of sample tone levels. An example of a possible sample set is shown in FIG. 12. Other samples, however, may be used. For ease of illustration, FIG. 12 shows increments of 10% white. Other increments, such as 10% or 2.5% white may be used. In a step the 804, one or more of the IPV, EPV, 1PV, or 2PV values are reassigned according to the post rip RENDER circuit described hereinbefore. In a step 806, a second set of sample tone levels is then produced. The second set of sample tone levels are selected the same as or similar to the first set, so that a comparison of the first set and second set in a step 808 will identify how the changes in step 804 have effected tone levels. The operator of the marking device may compare the sample tone levels either visually or using instrumentation, or the comparison may be automatically performed by, for instance, a scanner. One or more calibration set points are then determined in step 810. The calibration set points are determined by identifying a tone level from the first set that most closely matches a tone level from the second set. For instance, the 40% white tone level on the first sample output might match the 30% white tone level on the second sample output. In this case, the density of the 40% white tone level on the first sample output most closely approximates the density of the 30% white tone level on the second sample output. The relationship between these two sample tone levels defines a calibration set point between the print without post RIP rendering and print after post RIP rendering is activated. This comparison process can be repeated for more of the sample tone levels in FIG. 12 to generate more calibration set points. Between ten and twenty calibration set points is an exemplary amount to be determined. However, more or less calibration set points may be used, depending upon the circumstances.

Once the calibration set points have been determined, they are used to plot a custom or "UNDO" transfer curve of pre-RIP rendering tone levels vs. post-RIP rendering tone levels in a step 812. In this manner, appropriate post-RIP rendering tone level are mapped or calculated for a requested pre-RIP tone level. For instance, a calibration set point might indicate that a 30% white tone level printed from a post RIP rendering process produces the same output tone density as a 20% white tone level printed with no post RIP rendering. The result is that tone densities are lighter when post RIP rendering is utilized. The UNDO transfer function of the present invention corrects for this.

The UNDO tone transfer curve or function thus generated is associated with the selected post RIP rendering pixel values (e.g. IPV, EPV, 1PV, 2PV, etc.) in a step 814. In this manner, an operator may override the printer standard tone transfer function (e.g. via an undo button or command from the operator interface) with the UNDO tone transfer function to UNDO halftone/dot gain changes that otherwise would have occurred with the post RIP rendering function selected in a step 804. It is to be noted that the UNDO transfer function may be embedded into the digital image file before rasterization.

Figure 22:
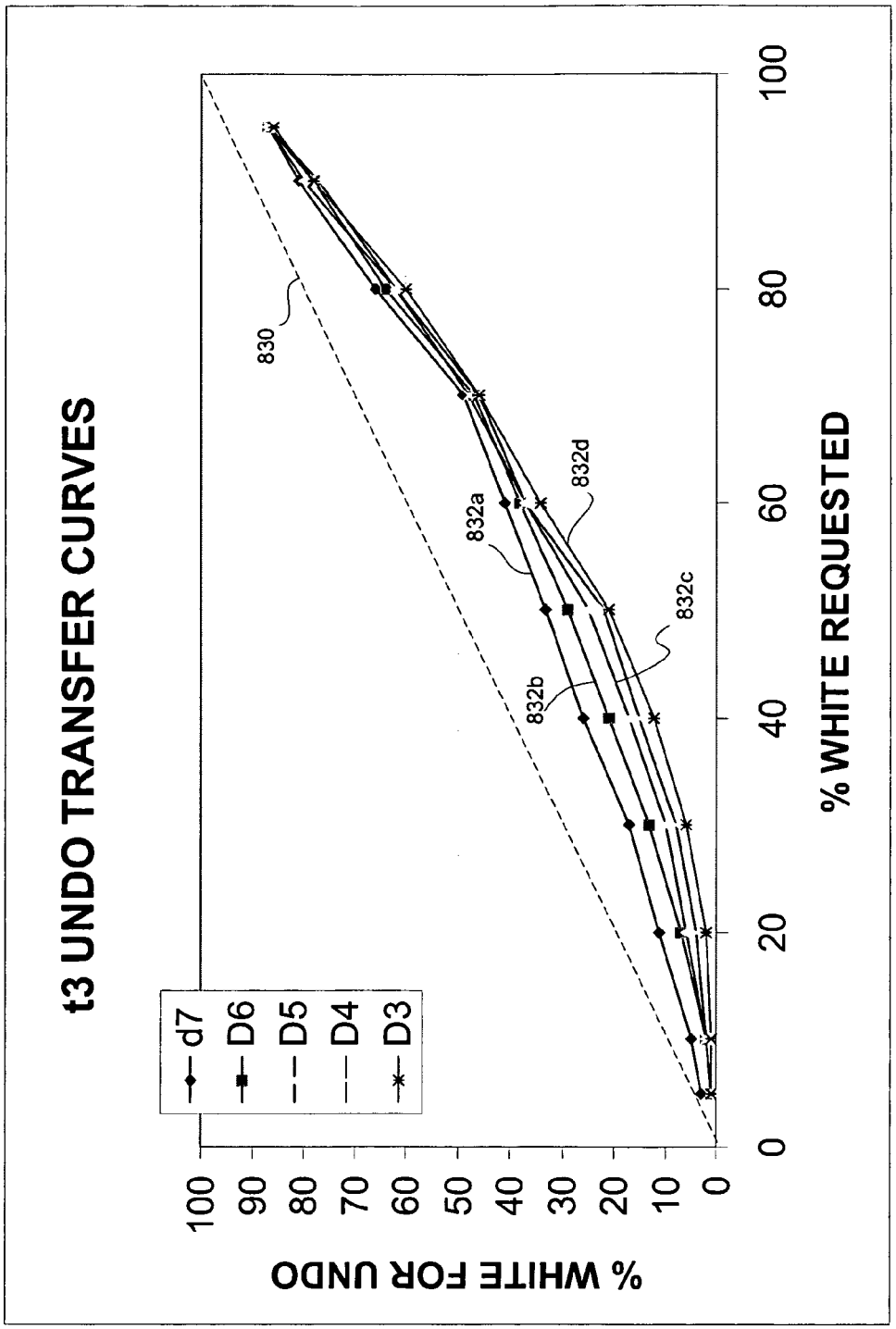
FIG. 22 shows a graph of five UNDO tone transfer function curves according to the present invention.

The generation of an UNDO tone transfer function (step 812) may be performed according to any of a number of different statistical methods. Given one or more calibration set points, a function should be defined that includes each of the set points. FIG. 22 shows a graph of output percentage white produced versus input percentage white requested for four different post RIP rendering settings. Typically, marking devices use a unity tone transfer function 830 to map input to output. At one end of the unity transfer function, a 0% white tone level request corresponds to a 0% tone level output. Likewise, at the other end, a 100% white tone level request corresponds to a 100% tone level output. In between these end points the unity transfer function produces a similar one-to-one correspondence for all input values. An UNDO tone transfer function differs in that it incorporates one or more calibration set points, such as set points 832a-d. For instance, the calibration set points of FIG. 21 are linked using linear segments. Alternatively, smooth curve segments may be used.

The method described above has generally been described with reference to the gray tone levels produced by a black and white printer. This method is equally applicable to systems that produce color output. In the case of a color printer that uses red, green, and blue (rgb) as its component colors, a separate undo tone transfer function should be generated for each of the three component colors. Similarly, in the case of a printer that uses cyan, yellow, magenta, and black as its component colors, a separate undo tone transfer function should be generated for each of those four component colors. In each of these cases, first and second sets of sample tone levels are produced for comparison of different shades of each component color. Additionally, the method can be applied to printers that produce accent colors and printers with any number of specialized supplemental color systems. Again, first and second sets of sample tone levels would be produced for each of the accent or supplemental colors.

Referring to FIG. 1a, collectively, the UNDO transfer function, RIP, MIP, and RENDER circuits may comprise an image processing subsystem. As a whole, the image processing subsystem receives an image from the client application, adjusts the tone transfer function to generate an UNDO tone transfer function, and processes the image using the UNDO tone transfer function to create a rasterized pixel stream. The rasterized pixel stream is then used by the marking engine to produce an output that is in accordance with the method described above.

The calibration set points may be sent from a calibration interface to the raster image processor, which generates an undo tone transfer function in accordance with the method described above. Alternatively, according to another presently preferred embodiment, the calibration set points may be sent to the client, and the undo tone transfer function may be generated and applied at the client level, as opposed to the marking-device level. In any of these cases, the undo tone transfer function may take the form of a lookup table that maps a given output tone level to a desired output tone level.

The logical operation of a process in accordance to that described above will now be discussed with reference to FIG. 23. First, a counter variable "n" is initialized and set equal to one in step 902. Next a sample tone level is selected from a first sample output in step 904. The sample tone level, for instance, may be based on its location at a pre-arranged position on the first sample output page. A variable, which may be referred to as white %1, is then set equal to the value of the percentage whiteness of the selected sample tone level in step 906. Next, in step 908, a sample tone level is selected from the second sample output. A second variable, which may be referred to as white %2, is then set equal to the value of the percentage whiteness of the selected sample tone level in step 910. Then, in step 912, the program determines whether white %1 is a close match for, or is approximately equal to, white %2. If there is a close match, the program goes to a step 915 to interpolate to achieve the best match and then to a step 918. If, however, there is no match, the program proceeds to step 914, in which the next sample tone level is selected from the second sample output. The program then determines whether the selected sample tone level is the last on the second sample output. If so, the program proceeds to step 918. If not, the program returns to steps 910 and 912 to determine whether this newly selected sample tone level from the second sample output matches the selected sample tone level from the first sample output.

In step 918, the program saves a calibration set point for the values ($x_n$=white %1, $y_n$=white %2). This occurs whenever a match is determined in step 912 or the last sample tone level from the second sample output has been compared with a given sample tone level from the first sample output. Once a calibration set point has been saved in step 918, the program determines whether the selected sample tone level is the last sample tone level on the first sample output in a step 920. If so, the program skips to step 926. If not, the program proceeds to step 922 to select the next sample tone level from the first sample output in step 920. The counter n is then incremented in step 924, and the program returns to step 906 to begin the process of determining a calibration set point for the newly selected sample tone level. In step 926, which commences once all of the calibration set points have been saved, the program generates an UNDO tone transfer function in accordance with the saved calibration set points. This may be accomplished according to the methods described above.

The basis of this invention is the creation of a transfer function which is submitted to the RIP. The transfer function is computed based on two inputs. One is the known effects of the post RIP algorithm settings which are selected by the user. The other is the desired halftone results when the job is printed.

As an example, a user may desire a change to the line width on the text part of his job, yet he is satisfied with the halftone result he achieves when there is no line width/dot gain adjustment. A transfer function can be computed to negate the effects the POST RIP algorithm (which is applied globally to the entire image) has on the halftones. This transfer function could be stored for each of the users print settings and employed when the user selects to maintain halftone appearance on the GUI.

Another example is a situation where the user is unhappy with the halftone result obtained at the settings which are optimal for text/line art. The user can then identify changes he wants in the halftone image. The user may specify desired halftone changes relative to the selected text/line art settings or relative to the base line settings (no text/line art adjustments). The method or UI (user interface) by which the user specifies the desired halftone results are numerous. The end result of specifying the halftone print results is a transfer function. Because the computed transfer function is applied only to halftones, the net result is independent settings for halftones and text/line art. This is accomplished for this type of job without the need for complex and artifact prone image segmentation algorithms.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

It should be understood that the programs, processes, methods and apparatus described herein are not related or limited to any particular type of computer or network apparatus (hardware or software), unless indicated otherwise. Various types of general purpose or specialized computer apparatus may be used with or perform operations in accordance with the teachings described herein. While various elements of the preferred embodiments have been described as being implemented in software, in other embodiments hardware or firmware implementations may alternatively be used, and vice-versa.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more, fewer or other elements may be used in the block diagrams.

The claims should not be read as limited to the described order or elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

The invention claimed is:

1. A method of printing a binary, multi-bit image comprising the steps of:
   converting the image into a digital bitmap comprised of an array of Text/line pixels and halftone pixels, wherein each pixel is assigned a digital value representing marking information;
   creating a custom tone transfer function created by comparing a first output to a second output, embedded in the digital bitmap;
   changing the value of halftone pixels using such custom tone transfer function;
   rasterizing the digital bitmap;
   independently reassigning the digital value of Text/Line pixels; and, printing the image.

2. An apparatus for printing a binary, multi-bit image comprising:
   a processor for converting the image into a digital bitmap including an array of Text/line pixels and halftone pixels, wherein each pixel is assigned a digital value representing marking information, and a custom tone transfer function created by comparing a first output to a second output, embedded in the digital bitmap; changing the value of halftone pixels using said custom tone transfer function embedded in the digital bitmap; rasterizing the digital bitmap; independently reassigning the digital value of Text/Line pixels; and,
   a print engine for printing the image.

3. An apparatus for altering the appearance of an input digital binary, multi-bit image when printed, the digital image comprised of an array of pixels and wherein each pixel is assigned a digital value representing marking information, and wherein the pixels comprise Text/Line pixels and halftone pixels, the apparatus comprising:
   a processor including a custom tone transfer function created by comparing a first output to a second output, embedded in a digital bitmap for changing the value of halftone pixels and Text/Line pixels independently using such custom tone transfer function; and,
   a print engine for printing the image.

* * * * *